US010386676B2

(12) United States Patent
Ishihara

(10) Patent No.: US 10,386,676 B2
(45) Date of Patent: Aug. 20, 2019

(54) COLOUR IMAGE DISPLAY DEVICE, AND COLOUR IMAGE DISPLAY METHOD

(71) Applicant: Sharp Kabushiki Kaisha, Sakai, Osaka (JP)

(72) Inventor: Tomoyuki Ishihara, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 173 days.

(21) Appl. No.: 15/539,527

(22) PCT Filed: Nov. 5, 2015

(86) PCT No.: PCT/JP2015/081115
§ 371 (c)(1),
(2) Date: Jun. 23, 2017

(87) PCT Pub. No.: WO2016/103922
PCT Pub. Date: Jun. 30, 2016

(65) Prior Publication Data
US 2017/0351144 A1    Dec. 7, 2017

(30) Foreign Application Priority Data

Dec. 25, 2014  (JP) ................................. 2014-263430

(51) Int. Cl.
*G02F 1/1335* (2006.01)
*G02F 1/133* (2006.01)
(Continued)

(52) U.S. Cl.
CPC ........ *G02F 1/133603* (2013.01); *G02F 1/133* (2013.01); *G09G 3/3406* (2013.01);
(Continued)

(58) Field of Classification Search
CPC ............... G02F 1/133603; G02F 1/133; G02F 2001/133622; G09G 3/3406;
(Continued)

(56) References Cited

U.S. PATENT DOCUMENTS

| 6,115,016 A | 9/2000 | Yoshihara et al. |
| 2002/0063670 A1 | 5/2002 | Yoshinaga et al. |

(Continued)

FOREIGN PATENT DOCUMENTS

| JP | H11-052327 A | 2/1999 |
| JP | 2002-318564 A | 10/2002 |

(Continued)

*Primary Examiner* — Mark Edwards
(74) *Attorney, Agent, or Firm* — ScienBiziP, P.C.

(57) ABSTRACT

A field-sequential color image display device is provided which can sufficiently reduce power consumption while suppressing color breakup. In a liquid crystal display device that displays a color image under a field sequential system in which each frame period includes four field periods corresponding to three primary colors, namely red, green, and blue, and a white color, the emission intensity of a light source section (120) during the white field period is determined in advance so that the white color is displayed at a target maximum luminance when the transmittance of a pixel array section (110) is at its maximum during all of the four field periods. A drive control section (200) separates an input image signal into white, blue, green, and red components, expands the white component, and then assigns the components to the four field periods. This causes the pixel array section (110) to, during the respective field periods, display images of the corresponding colors based on the signal components thus assigned, giving a color image by an additive color mixture over time.

6 Claims, 19 Drawing Sheets

(51) Int. Cl.
*G09G 3/34* (2006.01)
*H04N 9/31* (2006.01)
*G09G 3/36* (2006.01)

(52) U.S. Cl.
CPC ......... *G09G 3/3413* (2013.01); *G09G 3/3648* (2013.01); *H04N 9/3111* (2013.01); *H04N 9/3135* (2013.01); *H04N 9/3155* (2013.01); *H04N 9/3182* (2013.01); *G02F 2001/133622* (2013.01); *G09G 2300/0452* (2013.01); *G09G 2310/0235* (2013.01); *G09G 2320/0242* (2013.01)

(58) Field of Classification Search
CPC ............... G09G 3/3413; G09G 3/3648; G09G 2300/0452; G09G 2310/0235; G09G 2320/0242; H04N 9/3135; H04N 9/3155
See application file for complete search history.

(56) References Cited

U.S. PATENT DOCUMENTS

| | | |
|---|---|---|
| 2005/0088625 A1 | 4/2005 | Imade |
| 2006/0012608 A1* | 1/2006 | Lee ..................... G09G 3/3413 345/591 |
| 2007/0120766 A1* | 5/2007 | Yanamoto ............ G09G 3/3426 345/38 |
| 2007/0222743 A1 | 9/2007 | Hirakata |

FOREIGN PATENT DOCUMENTS

| | | |
|---|---|---|
| JP | 3450842 B | 9/2003 |
| JP | 2005-134482 A | 5/2005 |
| JP | 2007-256496 A | 10/2007 |
| JP | 2007310286 A | 11/2007 |
| JP | 2008-089929 A | 4/2008 |
| JP | 4841334 B | 12/2011 |

* cited by examiner

COLOUR IMAGE DISPLAY DEVICE, AND COLOUR IMAGE DISPLAY METHOD

TECHNICAL FIELD

The present invention relates to color image display devices and, in particular, to a color image display device, such as a liquid crystal display device, which displays a color image under a field sequential system.

BACKGROUND ART

In many liquid crystal display devices that display color images, three subpixels into which one pixel is divided are provided with color filters that transmit red (R), green (G), and blue (B) lights, respectively. However, since approximately ⅔ of backlight with which a liquid crystal panel is illuminated is absorbed by the color filters, a color-filter liquid crystal display device is undesirably low in light use efficiency. Given these circumstances, attention is drawn to a field-sequential liquid crystal display device that performs a color display without use of color filters.

In a typical field-sequential liquid crystal display device, one frame period, i.e. a period of display of one screen, is divided into three field periods, i.e. first, second, and third field periods (these "field periods" being also referred to as "subframe periods"). A color image is displayed on the liquid crystal panel by illuminating the liquid crystal panel with red, green, and blue light-source lights from behind during these first, second, and third field periods and by displaying, during the first field period, a red image corresponding to a red component of an input image signal, displaying, during the second field period, a green image corresponding to a green component of the input image signal, and displaying, during the third field period, a blue image corresponding to a blue component of the input image signal (such a field sequential system being hereinafter referred to as "simple RGB subframe system"). Such a field-sequential liquid crystal display device no longer requires color filters and is therefore higher in light use efficiency than a color-filter liquid crystal display device.

In a field-sequential display device, however, when an observer's line of sight moves within the display screen, shifts in the lighting timings of primary colors of light sources are recognized by the observer, with the result that the color of each field (each subframe) appears to be separate (this phenomenon being called "color breakup"). A known method for suppressing color breakup is a method by which at least one of the red, green, and blue components is displayed in two or more fields during one frame period. For example, in a field-sequential display device in which one frame period includes white, red, green, and blue field periods during which a white image, a red image, a green image, and a blue image are displayed, respectively, an image represented by an input image signal includes, as a red component, a red image that is displayed during the red and white field periods, as a green component, a green image that is displayed during the green and white field periods, and, as a blue component, a blue image that is displayed during the blue and white field periods (such a field sequential system being hereinafter referred to as "RGB+W subframe system").

Thought is given here to a case where a field-sequential liquid crystal display panel performs a maximum white display. In a simple RGB subframe display device, in this case, as shown in FIG. 23(A), during any of the red, green, and blue subframe periods, the transmittance of a corresponding pixel (optically-modulated pixel) of the liquid crystal panel is at its maximum, so that all of the light from the light source is used for the display. On the other hand, in an RGB+W subframe liquid crystal display device, as shown in FIG. 23(B), the transmittance of the optically-modulated pixel is at its maximum during the white subframe period, and during the red, green, and blue subframe periods, the light source emits light but the optically-modulated pixel enters a nontransparent state. For this reason, the RGB+W subframe system, when employed in a field-sequential liquid crystal display device, undesirably consumes more power than the simple RGB subframe system does.

In conjunction with the invention set forth in the present application, PTL 1, listed below, discloses a color liquid crystal display device that performs one frame display in fields of three primary colors and a field of a white color obtained by mixing the three primary colors. This color liquid crystal display device is intended to reduce power consumption while suppressing color breakup, and is configured to generate a display signal in the white field on the basis of a value obtained by dividing the minimum value Wmin of luminance per pixel in one frame of a three primary color signal that is inputted by the maximum value Wmax of the luminance and generate display signals in the fields of the three primary colors by subtracting, from the three primary color signal, a portion that is displayed in the white field.

CITATION LIST

Patent Literature

PTL 1: Japanese Patent No. 3450842
PTL 2: Japanese Patent No. 4841334
PTL 3: Japanese Unexamined Patent Application Publication No. 2007-310286
PTL 4: Japanese Unexamined Patent Application Publication No. 2002-318564
PTL 5: Japanese Unexamined Patent Application Publication No. 11-52327

SUMMARY OF INVENTION

Technical Problem

In the color liquid crystal display device disclosed in PTL 1 (Japanese Patent No. 3450842), however, a large proportion of light-source light is blocked in the red, green, and blue fields. Therefore, the proportion of the light-source light that does not contribute to display luminance is still so high that the maximum operating power required to achieve the target maximum display luminance of the color liquid crystal display device cannot be sufficiently lowered.

To address this problem, the present invention has as an object to provide a field-sequential color image display device that can sufficiently reduce power consumption while suppressing color breakup.

Solution to Problem

A first aspect of the present invention is directed to a color image display device of a field sequential system in which each frame period includes four field periods comprising of three field periods corresponding to three primary colors and one field period corresponding to a white color, including:

a light source section configured to be able to emit one by one four colors of light comprising of the three primary colors and the white color;

a spatial light modulation section that transmits or reflects light from the light source section; and a drive control section that drives the light source section to illuminate the spatial light modulation section with corresponding colors of light during the respective field periods and controls a transmittance or reflectance of the spatial light modulation section so that images of the corresponding colors are displayed during the respective field periods, wherein an emission intensity of the light source section during the field period corresponding to the white color is determined in advance so that the white color is displayed at a predetermined target maximum luminance by transmitted light or reflected light from the spatial light modulation section when the transmittance or reflectance of the spatial light modulation section is at its maximum during all of the four field periods, and the drive control section generates an enhanced image signal by enhancing a white component of input image signal in accordance with a ratio of white enhancement defined as a value of 1.0 or greater, assigns color components of the enhanced image signal that respectively correspond to the three primary colors and the white color to the corresponding field periods so that at least part of the white component of the enhanced image signal is assigned to the field period corresponding to the white color, and, during the respective field periods, controls the transmittance or reflectance of the spatial light modulation section according to the color components thus assigned.

A second aspect of the present invention is directed to the first aspect of the present invention, wherein the drive control section generates the enhanced image signal by expanding the white component of the input image signal according to the ratio of white enhancement.

A third aspect of the present invention is directed to the first aspect of the present invention, wherein with a ratio of white expansion and a ratio of white addition determined in advance on the basis of the ratio of white enhancement, the drive control section generates the enhanced image signal by expanding the white component of the input image signal according to the ratio of white expansion and adding an average of products for the three primary colors as a white component to the input image signal, the products being obtained by multiplying the primary color components, respectively, of the input image signal by the ratio of white addition.

A fourth aspect of the present invention is directed to the second or third aspect of the present invention, wherein in a case where the white component of the enhanced image signal is less than or equal to a white field gradation upper limit at which the transmittance or reflectance of the spatial light modulation section is at its maximum during the field period corresponding to the white color, the drive control section controls the transmittance or reflectance of the spatial light modulation section according to the white component during the field period corresponding to the white color and controls the transmittance or reflectance of the spatial light modulation section according to a corresponding primary color component of an image signal during each of the three field periods corresponding to the three primary colors, the image signal being obtained by subtracting the white component from the enhanced image signal, and in a case where the white component is greater than the white field gradation upper limit, the drive control section maximizes the transmittance or reflectance of the spatial light modulation section during the field period corresponding to the white color and controls the transmittance or reflectance of the spatial light modulation section according to a corresponding primary color component of an image signal during each of the three field periods corresponding to the three primary colors, the image signal being obtained by subtracting the white field gradation upper limit from the enhanced image signal.

A fifth aspect of the present invention is directed to the second or third aspect of the present invention, wherein in a case where a white field gradation target value of the white component of the enhanced image signal that corresponds to a ratio of white field target assignment inputted from an outside source or determined in advance is less than or equal to a white field gradation upper limit at which the transmittance or reflectance of the spatial light modulation section is at its maximum during the field period corresponding to the white color, the drive control section, based on the ratio of white field target assignment, controls the transmittance or reflectance of the spatial light modulation section according to the white field gradation target value during the field period corresponding to the white color and controls the transmittance or reflectance of the spatial light modulation section according to a corresponding primary color component of an image signal during each of the three field periods corresponding to the three primary colors, the image signal being obtained by subtracting the white field gradation target value from the enhanced image signal, and in a case where the white field gradation target value is greater than the white field gradation upper limit, the drive control section maximizes the transmittance or reflectance of the spatial light modulation section during the field period corresponding to the white color and controls the transmittance or reflectance of the spatial light modulation section according to a corresponding primary color component of an image signal during each of the three field periods corresponding to the three primary colors, the image signal being obtained by subtracting the white field gradation upper limit from the enhanced image signal.

A sixth aspect of the present invention is directed to the first aspect of the present invention, wherein the drive control section generates the enhanced image signal by adding an average of products for the three primary colors as a white component to the input image signal, the products being obtained by multiplying the primary color components, respectively, of the input image signal by a ratio of white addition obtained by subtracting 1 from the ratio of white enhancement.

A seventh aspect of the present invention is directed to the sixth aspect of the present invention, wherein during the field period corresponding to the white color, the drive control section controls the transmittance or reflectance of the spatial light modulation section according to the white component, the white component being the average of the products for the three primary colors, and during each of the three field periods corresponding to the three primary colors, the drive control section controls the transmittance or reflectance of the spatial light modulation section according to a corresponding primary color component of the input image signal.

A description of other aspects of the present invention is omitted, as such aspects are evident from the description of the first to seventh aspects of the present invention and each of the embodiments described below.

Advantageous Effects of Invention

In the first aspect of the present invention, an emission intensity of the light source section during the field period corresponding to the white color is determined in advance so that the white color is displayed at a predetermined target maximum luminance by transmitted light or reflected light from the spatial light modulation section when the transmittance or reflectance of the spatial light modulation section is at its maximum during all of the four field periods. Further, a white component of the input image signal is enhanced in accordance with a ratio of white enhancement defined as a value of 1.0 or greater, whereby an enhanced image signal is generated. The enhanced image signal is assigned to the four field periods so that at least part of a white component of this enhanced image signal is assigned to the field period corresponding to the white color. During the respective field periods, the transmittance or reflectance of the spatial light modulation section is controlled according to the color components thus assigned. In this way, according to the first aspect of the present invention, a white image of a gradation reflecting a desired target luminance is displayed during the field period corresponding to the white color, and in the case of a maximum white display, the transmittance or reflectance of the spatial light modulation section is at its maximum not only during the field period corresponding to the white color but also during the three field periods corresponding to the three primary colors. This makes it possible to suppress color breakup by displaying a white image during the field period corresponding to the white color and to make power consumption sufficiently lower than before by causing a large portion of emission energy from the light source section to contribute to the display.

According to the second aspect of the present invention, the enhanced image signal is generated by expanding the white component of the input image signal according to the ratio of white enhancement, and distribution of this enhanced image signal to the four field periods brings about the same effects as those brought about by the first aspect of the present invention.

According to the third aspect of the present invention, the enhanced image signal is generated according to a ratio of white expansion and a ratio of white addition determined in advance on the basis of the ratio of white enhancement. That is, the enhanced image signal is generated by expanding the white component of the input image signal according to the ratio of white expansion and adding an average of products for the three primary colors as a white component to the input image signal, the products being obtained by multiplying the primary color components, respectively, of the input image signal by the ratio of white addition. Distribution of this enhanced image signal to the four field periods brings about the same effects as those brought about by the first aspect of the present invention. Further, according to the third aspect of the present invention, the amount of white addition is made comparatively smaller than in a case where the enhanced image signal is generated from the input image signal on the basis of the ratio of white addition alone. This suppresses a decrease in color purity in the case of a monochromatic display. Furthermore, the third aspect of the present invention is smaller in difference between a maximum monochromatic display luminance sum and a maximum white display luminance than in a case where the enhanced image signal is generated from the input image signal on the basis of the ratio of white expansion alone. Therefore, the third aspect of the present invention is advantageous in terms of maintaining an additive color mixing property.

According to the fourth aspect of the present invention, in a case where the white component of the enhanced image signal is less than or equal to the white field gradation upper limit, the white component is assigned to the field period corresponding to the white color, and in a case where the white component is greater than the white field gradation upper limit, the white field gradation upper limit is assigned to the field period corresponding to the white color (that is, the transmittance or reflectance of the spatial light modulation section is maximized). In this way, the white component of the enhanced image signal is assigned as much as possible to the field period corresponding to the white color. This makes it possible to sufficiently suppress color breakup by displaying a white image during the field period.

According to the fifth aspect of the present invention, in a case where a white field gradation target value of the white component of the enhanced image signal that corresponds to a ratio of white field target assignment is less than or equal to the white field gradation upper limit, the white field gradation target value is assigned to the field period corresponding to the white color, and in a case where the white field gradation target value is greater than the white field gradation upper limit, the white field gradation upper limit is assigned to the field period corresponding to the white color (that is, the transmittance or reflectance of the spatial light modulation section is maximized). In this way, the white field gradation target value of the white component of the enhanced image signal that corresponds to the ratio of white field target assignment is assigned as much as possible to the field period corresponding to the white color. In the result, with the ratio of white field target assignment appropriately set (for example, at 0.5), the proportion of assignment of the white component of the enhanced image signal does not greatly vary depending on the input image signal between the field period corresponding to the white color and the field periods corresponding to the three primary colors. This reduces a sense of incongruity that is effected by a variation in the proportion of assignment of the white component to each field period depending on the input image signal.

According to the sixth aspect of the present invention, the enhanced image signal is generated by adding an average of products for the three primary colors as a white component to the input image signal, the products being obtained by multiplying the primary color components, respectively, of the input image signal by the ratio of white addition (i.e. a ratio obtained by subtracting 1 from the ratio of white enhancement). Distribution of this enhanced image signal to the four field periods brings about the same effects as those brought about by the first aspect of the present invention. Further, according to the sixth aspect of the present invention, the maximum monochromatic display luminance sum and the maximum white display luminance are equal, so that the additive color mixing property is ensured. This prevents a sense of incongruity from being felt in a display of a natural image or the like.

According to the seventh aspect of the present invention, an average of products for the three primary colors is assigned as a white component to the field period corresponding to the white color, the products being obtained by multiplying the primary color components, respectively, of the input image signal by the ratio of white addition (i.e. a ratio obtained by subtracting 1 from the ratio of white enhancement), and a corresponding primary color component of the input image signal is assigned to each of the three field periods corresponding to the three primary colors. This brings about the same effects as those brought about by the sixth aspect of the present invention.

A description of effects of other aspects of the present invention is omitted, as such effects are evident from the description of the effects of the first to seventh aspects of the present invention and the following embodiments.

BRIEF DESCRIPTION OF DRAWINGS

FIG. 10 illustrates diagrams (A to D) schematically showing three examples of the modulation signal generation process according to the third embodiment and processing results thereof.

FIG. 18 illustrates diagrams (A to D) schematically showing three examples of the modulation signal generation process according to the second example configuration of the fourth embodiment and processing results thereof.

DESCRIPTION OF EMBODIMENTS

Embodiments of the present invention are described below. The following assumes that one frame period is a period for refreshing one screen (i.e. rewriting a display image) and the length of "one frame period" is the length (16.67 ms) of one frame period in a common display device whose refresh rate is 60 Hz. However, the present invention is not limited to these assumptions.

1. First Embodiment 1.1 Overall Configuration

Figure 1:
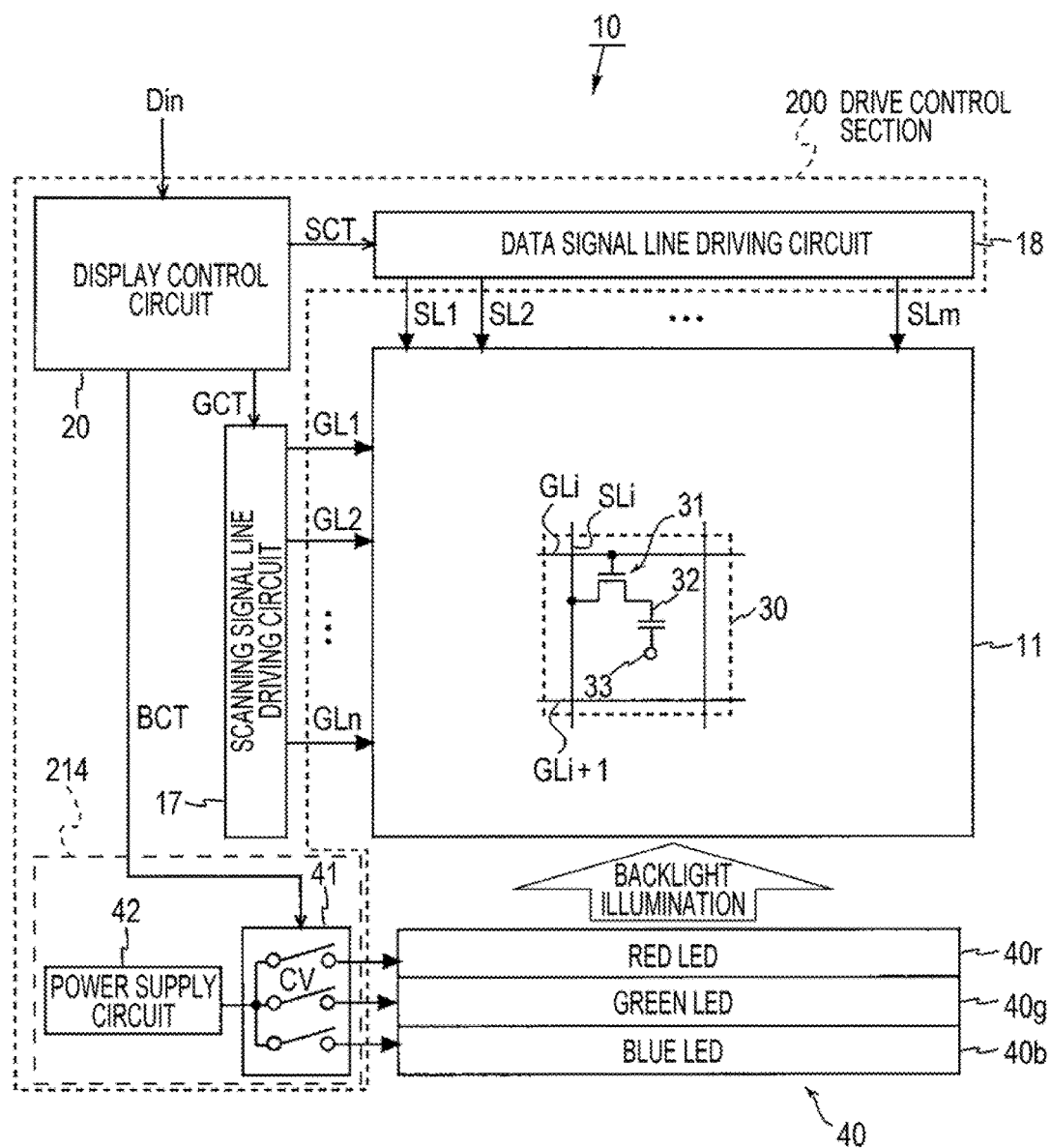
FIG. 1 is a schematic block diagram showing an overall configuration of a liquid crystal display device according to a first embodiment of the present invention.

FIG. 1 is a schematic block diagram showing an overall configuration of a field-sequential liquid crystal display device according to a first embodiment of the present invention. This liquid crystal display device 10 displays a color image under a field sequential system in which one frame period is divided into four field periods. This liquid crystal display device 10 includes a liquid crystal panel 11 serving as a display panel, a display control circuit 20, a scanning signal line driving circuit 17, a data signal line driving circuit 18, a backlight unit 40, and a light source driving section 214 comprising of a switch group 41 and a power supply circuit 42. It should be noted that the display control circuit 20, the scanning signal line driving circuit 17, the data signal line driving circuit 18, and the light source control section 214 (i.e. the switch group 41 and the power supply circuit 42) constitutes a drive control section 200. Further, the liquid crystal panel 11 is driven by the scanning signal line driving circuit 17 and the data signal line driving circuit 18 to control, on a pixel-by-pixel basis, the transmittance of light with which the liquid crystal panel 11 is illuminated from behind and function as a spatial light modulation section (as will be described in detail later).

The liquid crystal panel 11 includes a plurality of (m) data signal lines SL1 to SLm, a plurality of (n) scanning signal lines GL1 to GLn, and a plurality of (m×n) pixel forming sections 30 provided in correspondence with points of intersection between those data signal lines SL1 to SLm and those scanning signal lines GL1 to GLn. Each of the pixel forming sections 30 includes a TFT 31 serving as a switching element, a pixel electrode 32 connected to a drain terminal of the TFT 31, and a common electrode 33 that forms a liquid crystal capacitance with the pixel electrode 32. The TFT 31 has its gate terminal connected to a scanning signal line GLi (1≤i≤n) and its source terminal connected to a data signal line SLj (1≤j≤m).

The display control circuit 20 receives an input signal Din from an outside source. This input signal Din contains, as an input image signal, red, green, and blue image signals Rin, Bin, and Rin representing red, green, and blue components, respectively, of the image to be displayed, and also contains a control signal representing a timing and the like that are needed to display the image represented by the input image signal. The display control circuit 20 generates a scanning-side control signal GCT, a data-side control signal SCT, and a light source control signal BCT in accordance with such an input signal Din. The scanning-side control signal GCT, the data-side control signal SCT, and the light source control signal BCT are supplied to the scanning signal line driving circuit 17, the data signal line driving circuit 18, and (the switch group 41 of) the light source driving section 214, respectively.

The scanning-side control signal GCT that is supplied to the scanning signal line driving circuit 17 contains a scanning-side start pulse signal, a scanning-side clock signal, and the like. The scanning signal line driving circuit 17 applies active scanning signals to the scanning signal lines GL1 to GLn in sequence in accordance with these signals. In the present embodiment, as will be described later, a white gradation signal Wf, a red gradation signal Rf, a green gradation signal Gf, and a blue gradation signal Bf are generated on the basis of the inputted red, green, and blue image signals Rin, Gin, and Bin as signals representing display intensity, and each frame period is divided into four field periods comprising of a white field period Tw during which a white image represented by the white gradation signal Wf is displayed, a blue field period Tb during which a blue image represented by the blue gradation signal Bf is displayed, a green field period Tg during which a green image represented by the green gradation signal Gf is displayed, and a red field period Tr during which a red image represented by the red gradation signal Rf is displayed (see FIG. 3). In each of the field periods Tw, Tb, Tg, and Tr, the scanning signal line driving circuit 17 applies active scanning signals to the n scanning signal lines GL1 to GLn in sequence.

The data-side control signal SCT that is supplied to the data signal line driving circuit 18 contains a white modulation signal Sw, a blue modulation signal Sb, a green modulation signal Sg, and a red modulation signal Sr as optical modulation signals that control the transmittance of light in each of the pixel forming sections 30 serving to form the image to be displayed, and also contains a data-side start pulse signal, a data-side clock signal, a latch strobe signal, and the like. The data signal line driving circuit 18, which has a shift register, a sampling latch circuit, and the like (not illustrated) inside, brings the shift register, the sampling latch circuit, and the like into operation in accordance with these signals, generates m data signals as driving image signals by converting four types of parallel digital signal corresponding to the white modulation signal Sw, the blue modulation signal Sb, the green modulation signal Sg, and the red modulation signal Sr, respectively, into analog signals with a DA conversion circuit (not illustrated) in sequence every single field period, and applies these data signals to the data signal lines SL1 to SLm, respectively. Note here that, during the white field period Tw, a data signal representing the white image in accordance with the white modulation signal Sw is applied to the data signal lines SL1 to SLm, that, during the blue field period Tb, a data signal representing the blue image in accordance with the blue modulation signal Sb is applied to the data signal lines SL1 to SLm, that, during the green field period Tg, a data signal representing the green image in accordance with the green modulation signal Sg is applied to the data signal lines SL1 to SLm, and that, during the red field period Tr, a data signal representing the red image in accordance with the red modulation signal Sr is applied to the data signal lines SL1 to SLm. It should be noted that, as will be described later, the white modulation signal Sw, the blue modulation signal Sb, the green modulation signal Sg, and the red modulation signal Sr, which serve as optical modulation signals that control the transmittance of each of the pixel forming sections 30, correspond to the white gradation signal Wf, the blue gradation signal Bf, the green gradation signal Gf, and the red gradation signal Rf, which serve as signals representing display intensity, respectively.

Figure 3:
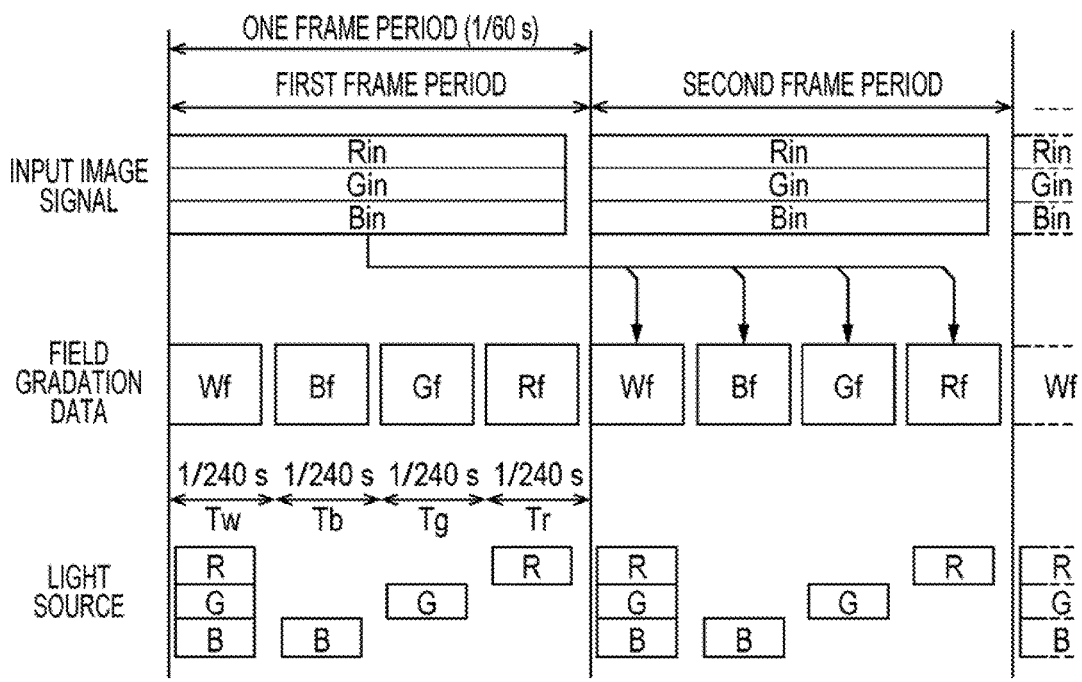
FIG. 3 is a timing chart for explaining how the liquid crystal display device according to the first embodiment operates.

The backlight unit 40 includes a two-dimensional arrangement of a red LED (light-emitting diode) 40r, a green LED 40g, and a blue LED 40b. The red LED 40r, the green LED 40g, and the blue LED 40b are configured to be each independently connectable to the power supply circuit 42 via the switch group 41. The display control circuit 20 supplies the light source control signal BCT to the switch group 41 so that, in the backlight unit 40, as shown in FIG. 3, all of the red, green, and blue LEDs 40r, 40g, and 40b emit light during the white field period Tw, only the blue LED 40b emits light during the blue field period Tb, only the green LED 40g emits light during the green field period Tg, and only the red LED 40r emits light during the red field period Tr. Note here that each of the LEDs 40r, 40g, and 40b is configured such that its emission intensity can be adjusted by pulse width modulation or the like by the switch group 41. The setting of such an emission intensity will be described later. It should be noted that although the present embodiment is configured such that the liquid crystal panel 11 is illuminated (from behind) with four types of light-source light, namely red light, green light, blue light, and white light, by three types of light source, namely, the red LED 40r, the green LED 40g, and the blue LED 40b, the present embodiment is not limited to this configuration. For example, a white LED that emits white light may be separately provided in addition to the red LED 40r, the green LED 40g, and the blue LED 40b, and during the white field period Tw, only the white LED may emit light or the white LED may emit light together with the red LED 40r, the green LED 40g, and the blue LED 40b. Further, although the present embodiment is configured to include a direct backlight unit 40 including a two-dimensional arrangement of LEDs, the present embodiment may alternatively be configured to include an edge lighting backlight unit 40 including a one-dimensional arrangement of LEDs and a light-guiding plate.

In the present embodiment, on the precondition that the emission intensity of each of the light sources, namely the red LED 40r, the green LED 40g, and the blue LED 40b, during a field period other than the white field period Tw takes on a preset value, the emission intensity of the white light source during the white field period Tw is determined so that the liquid crystal panel 11 can achieve a target luminance that should correspond to a maximum white display that can be represented by the input image signal (contained in the input signal Din). That is, the emission intensity of the white light source is determined so that the target luminance is achieved when the transmittance of (the pixel forming sections 30 of) the liquid crystal panel 11 is at its maximum during all of the white, blue, green, and red field periods Tw, Tb, Tg, and Tr. It should be noted that, in the present embodiment, the white light source is achieved by the red LED 40r, the green LED 40g, and the blue LED 40b, all of the red, green, and blue LEDs 40r, 40g, and 40b are lit during the white field period Tw, and the emission intensity of each LED 40x (x=r, g, b) during this period of time is an intensity that corresponds to the emission intensity of the white light source thus determined. For this reason, each LED 40x (x=r, g, b) lights at one emission intensity during the white field period Tw and lights at another emission intensity during a field period corresponding to the color of that LED (e.g. the red field period Tr, if that LED is the red LED 40r) (see FIG. 5(A) and the like described below).

In the present embodiment, as described above, data signals are applied to the data signal lines SL1 to SLm, active scanning signals are applied to the scanning signal lines GL1 to GLn in sequence, and the backlight 40 illuminates the liquid crystal panel 11 with white light, blue light, green light, and red light from behind in sequence every single field period. Further, the common electrode 33 provided commonly to the pixel forming sections 30 of the liquid crystal panel 11 is supplied with a predetermined voltage from a common electrode driving circuit (not illustrated), and the pixel electrodes 32 and the common electrode 33 apply voltages corresponding to the white, blue, green, and red modulation signals Sw, Sb, Sg, and Sr to the liquid crystal of each of the pixel forming sections 30. In this way, the transmittance of white light, blue light, green light, or red light with which the liquid crystal panel 11 is illuminated from behind during the white, blue, green, and red field periods Tw, Tb, Tg, and Tr, respectively, is controlled by the voltages applied to the liquid crystal of each of the pixel forming sections 30, whereby the color image represented by the input image signal is displayed on the liquid crystal panel 11 by an additive color mixture over time.

1.2 Modulation Signal Generation Process

Figure 2:
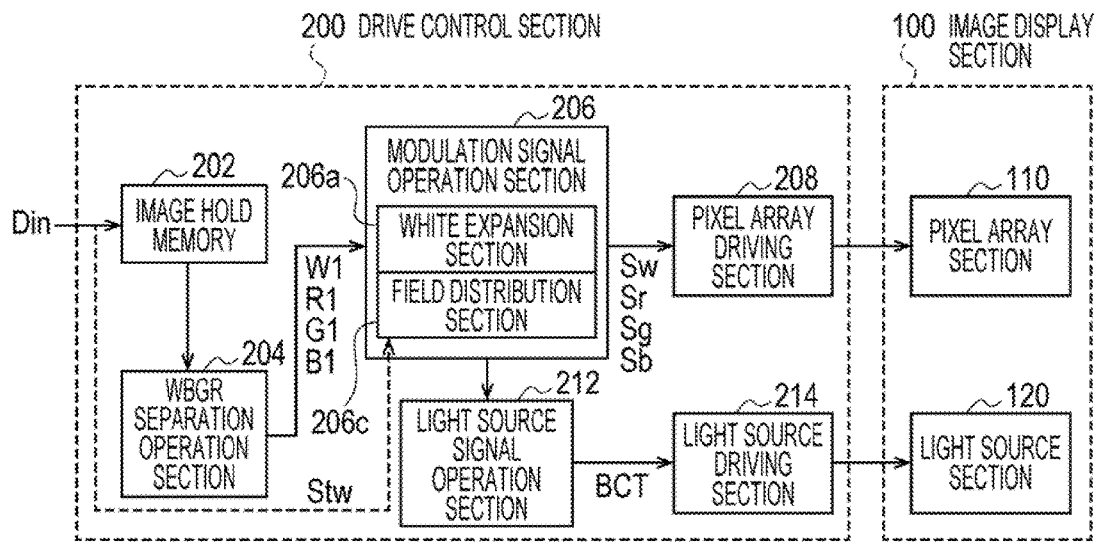
FIG. 2 is a block diagram showing a functional configuration of the liquid crystal display device according to the first embodiment.
Figure 4:
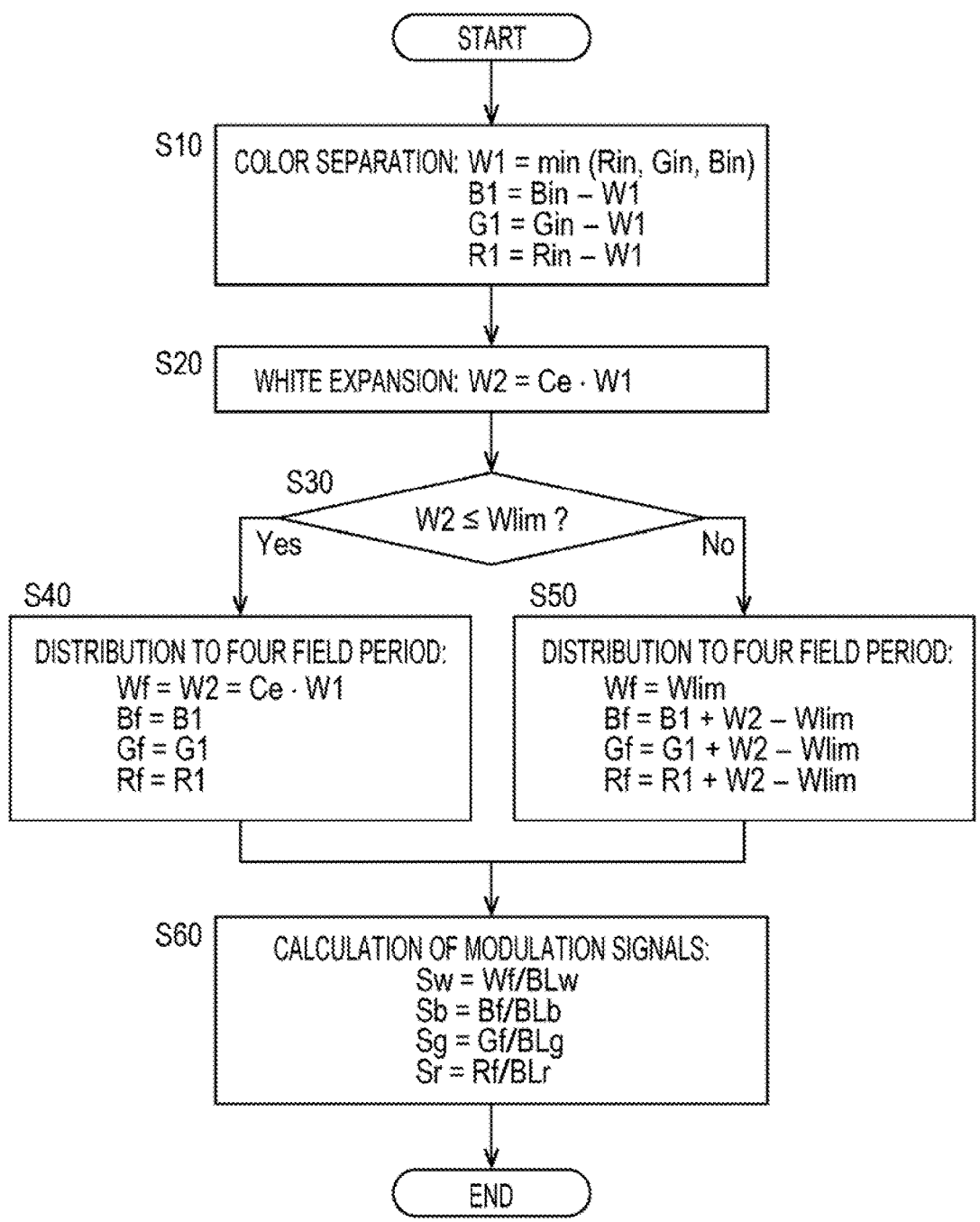
FIG. 4 is a flow chart showing a procedure of a modulation signal generation process according to the first embodiment.

FIG. 2 is a block diagram showing a functional configuration of the liquid crystal display device 10 according to the present embodiment. FIG. 3 is a timing chart for explaining how the liquid crystal display device 10 according to the present embodiment operates. FIG. 4 is a flow chart showing a procedure of a modulation signal generation process for generating modulation signals (namely, a white modulation signal Sw, a blue modulation signal Sb, a green modulation signal Sg, and a red modulation signal Sr) from an input image signal contained in an input signal Din according to the present embodiment. The modulation signal generation process according to the present embodiment is described below with reference to FIGS. 2 to 4.

As shown in FIG. 2, from a functional standpoint, the liquid crystal display device 10 according to the present embodiment is comprising of an image display section 100 and the drive control section 200. The image display section 100 includes a pixel array section 110, which is equivalent to the liquid crystal panel 11, and a light source section 120, which is equivalent to the backlight unit 40. The drive control section 200 includes an image hold memory 202, a WBGR separation operation section 204, a modulation signal operation section 206, a pixel array driving section 208, a light source signal operation section 212, and a light source driving section 214, and an input signal Din from an outside source is supplied to the image hold memory 202. It should be noted that the image hold memory 202, the WBGR separation operation section 204, the modulation signal operation section 206, and the light source signal operation section 212 are included in the display control circuit 20 shown in FIG. 1. Further, the pixel array driving section 208 is constituted by the data signal line driving circuit 18 and the scanning signal line driving circuit 17.

In the present embodiment, as shown in FIG. 3, each frame period is divided into four field periods (namely white, blue, green, and red field periods Tw, Tb, Tg, and Tr). The frame period on which attention is focused here for illustrative purposes is referred to as "first frame period", and the frame period immediately following the first frame period is referred to as "second frame period".

Blue, Red, green, and red image signals Bin, Gin, and Rin constituting an input image signal contained in an input signal Din received from an outside source in the first frame period are first stored in the image hold memory 202. Next, the WBGR separation operation section 204 separates this input image signal into coloring components, namely red, green, and blue components, and a white component. That is, from the red, green, and red image signals Rin, Gin, and Rin stored in the image hold memory 202, the WBGR separation operation section 204 generates a white component gradation value W1, a blue coloring component gradation value B1, a green coloring component gradation value G1, and a red coloring component gradation value R1 for each pixel according to formulas (1) to (4) below (step S10 of FIG. 4). It should be noted that, in the following, min represents an operation of finding a minimum value. Further, in the following, the terms such as "gradation values", "signals", "gradation data" that differ in quantitative scope but can be deemed to be identical in content are given the same reference signs.

$$W1 = \min(Rin, Gin, Bin) \tag{1}$$

$$B1 = Bin - W1 \tag{2}$$

$$G1 = Gin - W1 \tag{3}$$

$$R1 = Rin - W1 \tag{4}$$

Note here that the white component gradation value W1 can be deemed to be the white component of the input image signal and is equivalent to a combination of red, green, and blue coloring component gradation values having the same value W1. It should be noted that a white component gradation value W1, a blue coloring component gradation value B1, a green coloring component gradation value G1, and a red coloring component gradation value R1 of one frame that are generated as described above from the input image signal of the first frame period are hereinafter referred to as "white component gradation data W1", "blue coloring component gradation data B1", "green coloring component gradation data G1", and "red coloring component gradation data R1", respectively (the same applies to the other embodiments described below).

The modulation signal operation section 206 performs white expansion and field distribution for each pixel in accordance with the white component gradation value W1, the blue coloring component gradation value B1, the green coloring component gradation value G1, and the red coloring component gradation value R1. That is, the modulation signal operation section 206 includes a white expansion section 206a and a field distribution section 206c to perform the following processes. It should be noted that the already-described white, red, green, and blue gradation signals Wf, Rf, Gf, and Bf are signals that represent in sequence the white, red, green, and blue field gradation values Wf, Rf, Gf, and Bf, respectively, of a pixel in the image to be displayed.

The white expansion section 206a expands the white component of the input image signal by multiplying each white component gradation value W1 in the white component gradation data W1 by a ratio of white expansion Ce (Ce>1) (step S20). In the present invention, which includes the white field period, this ratio of white expansion Ce is equivalent to a ratio (hereinafter referred to as "ratio of white enhancement") for enhancing the white component of the input image signal to appropriately control a display state with respect to the input image signal, and this ratio of white expansion Ce is determined in advance in consideration of the emission intensity of the light source during each of the field periods Tw, Tb, Tg, and Tr so that when the transmittance of the liquid crystal panel 11 is at its maximum during all of the field periods Tw, Tb, Tg, and Tr in a case where the input image signal represents a maximum white display, the liquid crystal panel 11 can achieve a target luminance that should correspond to the maximum white display. A white gradation value after white component expansion (hereinafter referred to as "expanded white gradation value") W2 based on such a ratio of white expansion Ce is given by $$W2=Ce \cdot W1 =Ce \cdot \min(Rin,Gin,Bin) \qquad (5)$$

In the present embodiment, the generation of such an expanded white gradation value W2 results in the generation of an enhanced image signal constituted by the expanded white gradation value W2, the blue coloring component gradation value B1, the green coloring component gradation value G1, and the red coloring component gradation value R1 for each pixel. It should be noted that the ratio of white enhancement and the ratio of white expansion Ce are both greater than 1.0.

The field distribution section 206c distributes the enhanced image signal, constituted by the expanded white gradation value W2, the blue coloring component gradation value B1, the green coloring component gradation value G1, and the red coloring component gradation value R1 for each pixel, to each of the field periods Tw, Tb, Tg, and Tr. That is, from the expanded white gradation value W2, the blue coloring component gradation value B1, the green coloring component gradation value G1, and the red coloring component gradation value R1, the field distribution section 206c calculates for each pixel the white, blue, green, and red field gradation values Wf, Bf, Gf, and Rf that are to be assigned to the white, blue, green, and red field periods Tw, Tb, Tg, and Tr, respectively (steps S30 to S50). After that, the field distribution section 206c generates modulation signals Sw, Sb, Sg, and Sr in accordance with the white, blue, green, and red field gradation values Wf, Bf, Gf, and Rf calculated for each pixel (step S60).

In the present embodiment, the distribution is performed so that as large a white gradation value as possible is distributed to the white field period Tw. Alternatively, such a configuration is conceivable that a signal (hereinafter referred to as "white field assignment control signal Stw") for designating a ratio (hereinafter referred to as "ratio of white field target assignment Ctw") of the expanded white gradation value W2 that is to be assigned to the white field period Tw may be inputted to the field distribution section 206c (see the dotted signal line of FIG. 2). This configuration will be described as a configuration of the second embodiment described below.

In order to assign as large a white gradation value as possible to the white field period Tw, the present embodiment first determines whether the expanded white gradation value W2 is less than or equal to an upper limit Wlim (hereinafter referred to as "white field gradation upper limit Wlim") of a white gradation value that can be assigned to the white field period Tw (step S30). This white field gradation upper limit Wlim is equivalent to the display intensity at which the transmittance of the liquid crystal panel 11 is at its maximum during the white field period Tw.

In a case where, as a result of the determination, the expanded white gradation value W2 is less than or equal to the white field gradation upper limit Wlim, the field distribution section 206c assigns the white, blue, green, and red field gradation values Wf, Bf, Gf, and Rf, represented by formulas (6) to (9) below, to the white field period Tw, the blue field period Tb, the green field period Tg, and the red field period Tr, respectively (step S40).

$$Wf=W2=Ce \cdot W1 \qquad (6)$$

$$Bf=B1 \qquad (7)$$

$$Gf=G1 \qquad (8)$$

$$Rf=R1 \qquad (9)$$

In a case where, as a result of the determination, the expanded white gradation value W2 is greater than the white field gradation upper limit Wlim, the field distribution section 206c assigns the white, blue, green, and red field gradation values Wf, Bf, Gf, and Rf, represented by formulas (10) to (13) below, to the white field period Tw, the blue field period Tb, the green field period Tg, and the red field period Tr, respectively (step S50).

$$Wf=W\lim \qquad (10)$$

$$Bf=B1+W2-W\lim \qquad (11)$$

$$Gf=G1+W2-W\lim \qquad (12)$$

$$Rf=R1+W2-W\lim \qquad (13)$$

Note here that the residual white gradation value "W2−Wlim" obtained by subtracting the white field gradation value Wf=Wlim from the expanded white gradation value W2 is equivalent to a combination of red, green, and blue gradation values having the same value "W2−Wlim". For this reason, as indicated by formulas (11) to (13) above, each of the gradation values of the coloring components, namely the blue field gradation value Bf, the green field gradation value Gf, and the red field gradation value Rf, includes the residual white gradation value W2−Wlim.

In the following, white, blue, green, and red field gradation values Wf, Bf, Gf, and Rf of one frame that correspond to the input image signal of the first frame period are referred to as "white field gradation data Wf", "blue field gradation data Bf", "green field gradation data Gf", and "red field gradation data Rf", respectively (the same applies to the other embodiments described below). As shown in FIG. 3, the white field gradation data Wf, the blue field gradation data Bf, the green field gradation data Gf, and the red field gradation data Rf are assigned to the white, blue, green, and red field periods Tw, Tb, Tg, and Tr, respectively, of the second frame period.

Next, in accordance with the field gradation values Wf, Bf, Gf, and Rf in the field gradation data that were assigned to the respective field periods Tw, Tb, Tg, and Tr, the field distribution section 206c calculates, according to formulas (14) to (17) below, modulation signals Sw, Sb, Sg, and Sr that are to be supplied to the pixel array driving section 208 for image display during the respective field periods (step S60).

$$Sw = Wf/BLw \quad (14)$$

$$Sb = Bf/BLb \quad (15)$$

$$Sg = Gf/BLg \quad (16)$$

$$Sr = Rf/BLr \quad (17)$$

Note here that the red LED 40r, the green LED 40g, and the blue LED 40b light as a white light source by emitting light at the same emission intensity BLw during the white field period Tw, that only the blue LED 40b lights at an emission intensity BLb during the blue field period Tb, that only the green LED 40g lights at an emission intensity BLg during the green field period Tg, and that only the red LED 40r lights at an emission intensity BLr during the red field period Tr. Of these emission intensities of the light sources, the emission intensities BLb, BLg, and BLr during the blue field period Tb, the green field period Tg, and the red field period Tr are preset values based on the ratings of the blue, green, and red LEDs 40b, 40g, and 40r, and as mentioned earlier, the emission intensity BLw of each of the LEDs 40b, 40g, and 40r during the white field period Tw is determined so that the liquid crystal panel 11 can achieve the target luminance that should correspond to the maximum white display that can be represented by the input image signal.

Of the modulation signals Sw, Sb, Sg, and Sr thus calculated, the white modulation signal Sw represents the transmittance of each pixel forming section during the white field period Tw, the blue modulation signal Sb represents the transmittance of each pixel forming section during the blue field period Tb, the green modulation signal Sg represents the transmittance of each pixel forming section during the green field period Tg, and the red modulation signal Sr represents the transmittance of each pixel forming section during the red field period Tr. These modulation signals Sw, Sb, Sg, and Sr are supplied to the pixel array driving section 208. The pixel array driving section 208 drives the pixel array section 110 in accordance with these modulation signals Sw, Sb, Sg, and Sr in the second frame period.

Meanwhile, the light source operation section 212 generates the already-described light source control signal BCT in accordance with the timing of generation of the modulation signals Sw, Sb, Sg, and Sr by the modulation signal operation section 206 and supplies this light source control signal BCT to the light source driving section 214 (see the switch group 41 shown in FIG. 1). In accordance with this light source control signal BCT, the light source driving section 214 causes the LEDs 40b, 40g, and 40r to light at the aforementioned emission intensities during the respective field periods Tw, Tb, Tg, and Tr.

By thus driving the pixel array section 110 and the light source section 120, the amounts of transmission of light from the white, blue, green, and red light sources in each of the pixel forming sections 30 are controlled in accordance with the modulation signals Sw, Sb, Sg, and Sr during the white field period Tw, the blue field period Tb, the green field period Tg, and the red field period Tr, respectively, whereby the white image represented by the white gradation data Wf, the blue image represented by the blue field gradation data Bf, the green image represented by the green field gradation data Gf, and the red image represented by the red field gradation data Rf are displayed during the white field period Tw, the blue field period Tb, the green field period Tg, and the red field period Tr, respectively. Such a field sequential system allows the color image represented by the input image signal to be displayed by the pixel array section 110.

In the present embodiment, as described above, the pixel array section 110 is driven in accordance with the white modulation signal Sw during the white field period Tw, driven in accordance with the blue modulation signal Sb during the blue field period Tb, driven in accordance with the green modulation signal Sg during the green field period Tg, and driven in accordance with the red modulation signal Sr during the red field period Tr in order to display the color image under a field sequential system (FIG. 3). For this reason, the generation of these modulation signals Sw, Sb, Sg, and Sr through the process shown in FIG. 4 requires a memory in which to temporarily store (at least part of) the white component gradation data W1 and coloring component gradation data B1, G1, and R1 and the field gradation data Wf, Bf, Gf, and Rf. Even without use of such a memory, however, the modulation signals Sw, Sb, Sg, and Sr can be generated in the following way so that the color image can be displayed under the field sequential system.

That is, since the blue, green, and red image signals Bin, Gin, and Rin constituting the input image signal of one frame of the first frame period are stored in the image hold memory 202, these image signals Bin, Gin, and Rin are used to execute the modulation signal generation process shown in FIG. 4 for each pixel during each of the field periods Tw, Tb, Tg, and Tr of the second frame period. This allows the white modulation signal Sw, the blue modulation signal Sb, the green modulation signal Sg, and the red modulation signal Sr to be generated during the white field period Tw, the blue field period Tb, the green field period Tg, and the red field period Tr, respectively. In this case, however, the modulation signal generation process of FIG. 4 needs only be executed for each pixel during each field period Tx (x=w, b, g, r) such that only the white component gradation value W1 and a coloring component gradation value X1 of a color corresponding to that field period Tx are calculated in step S10, that only a field gradation value Xf of the color corresponding to that field period Tx is calculated in steps S40 and S50, and that only a modulation signal Sx of the color corresponding to that field period Tx is calculated in step S60. For example, the modulation signal generation process of FIG. 4 needs only be executed for each pixel during the blue field period Tb such that only the white component gradation value W1 and the blue coloring component gradation value B1 are calculated in step S10, that only the blue field gradation value Bf is calculated in steps S40 and S50, and that only the blue modulation signal Sb is calculated in step S60.

1.3 Examples of the Modulation Signal Generation Process and Processing Results Thereof Next, three examples of the modulation signal generation process according to the present embodiment are described with reference to FIG. 5. It should be noted that the emission intensity of each light source is controlled according to an electric current that is supplied to an LED serving as a device that constitute the light source and the lighting time (pulse width) of the LED. Due to the characteristics and the like of an LED serving as a device for use in each light source, white light is not always obtained in a case where the red LED, the green LED, and the blue LED are driven by the same electric current or pulse width; however, for convenience of explanation, the following assumes that the emission intensities of the red, green, and blue light sources at which the display can appropriately express a white color in a case where the red LED 40r serving as the red light source, the green LED 40g serving as the green light source, and the blue LED 40b serving as the blue light source emit light are of the same magnitude. Further, there is usually a non-linear relationship, called a gamma curve, between a gradation value of an input image signal and a luminance value of an image that is actually displayed; therefore, there is also usually a non-linear relationship between the gradation value of the input image signal and the transmittance of the liquid crystal in a corresponding pixel forming section 30. However, for convenience of explanation, the following assumes that the input image signal is corrected in advance so that there is a linear relationship between the gradation value and the transmittance.

Figure 5:
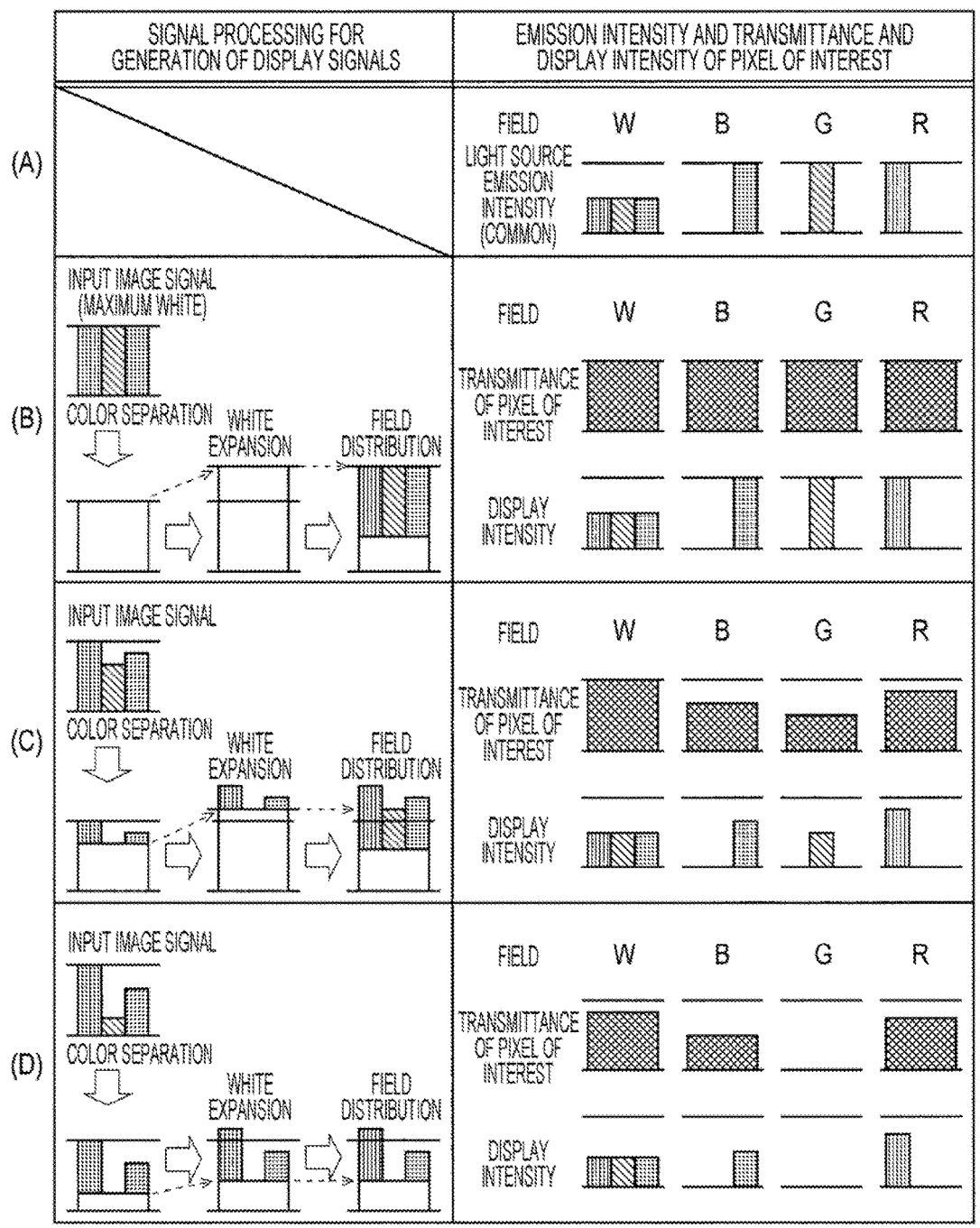
FIG. 5 illustrates diagrams (A to D) schematically showing three examples of the modulation signal generation process according to the first embodiment and processing results thereof.

Further, while the foregoing description of the modulation signal generation process relates to the generation of modulation signals for an input image signal of one frame (see FIG. 3), the three examples shown in FIG. 5 relate to the generation of modulation signals for one pixel represented by an input image signal. In the following, one pixel on which attention is focused in the description of the modulation signal generation process is referred to as "pixel of interest".

FIG. 5(A) schematically shows, in its right column, the emission intensities of the light sources during each field period. FIGS. 5(B) to 5(D) schematically show, in their left columns, first to third examples, respectively, of the modulation signal generation process and schematically show, in their right columns, the transmittance of a pixel forming section 30 corresponding to the pixel of interest (such transmittance being hereinafter referred to as "transmittance of the pixel of interest") as the results of the first to third examples of the modulation signal generation period, together with the display intensity of the pixel of interest. It should be noted, in FIG. 5, that those gradation values, emission intensities, and display intensities which are associated with a red color are indicated by vertically-hatched rectangles, that those gradation values, emission intensities, and display intensities which are associated with a green color are indicated by diagonally-hatched rectangles, that those gradation values, emission intensities, and display intensities which are associated with a blue color are indicated by dot-hatched rectangles, and that those gradation values which are associated with a white color are indicated by hatching-free rectangles. Further, in the right columns of FIGS. 5(A) to 5(D), the field-specifying signs "W", "B", "G", and "R" represent the white field period Tw, the blue field period Tb, the green field period Tg, and the red field period Tr, respectively.

Figure 7:
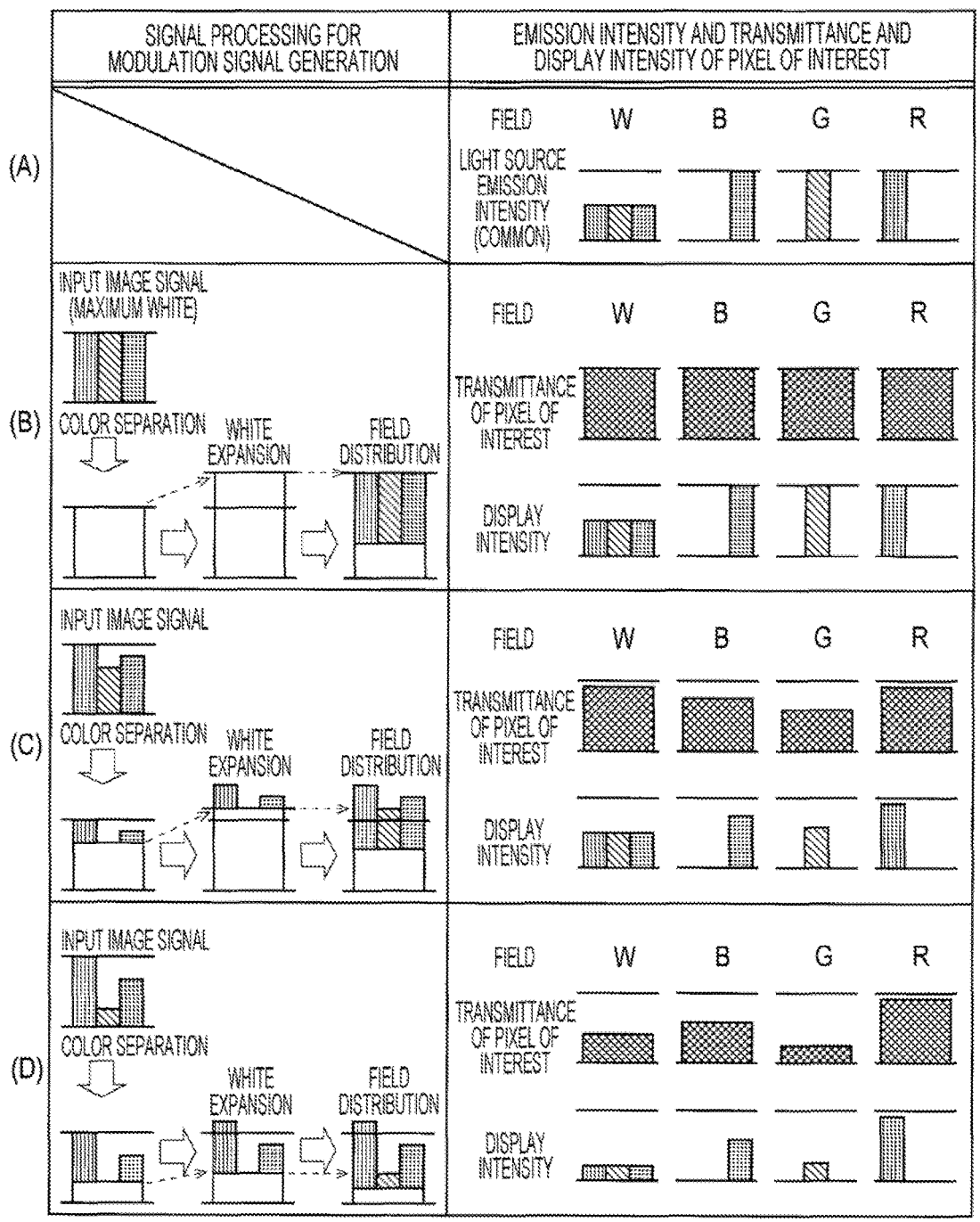
FIG. 7 illustrates diagrams (A to D) schematically showing three examples of the modulation signal generation process according to the second embodiment and processing results thereof.
Figure 10:
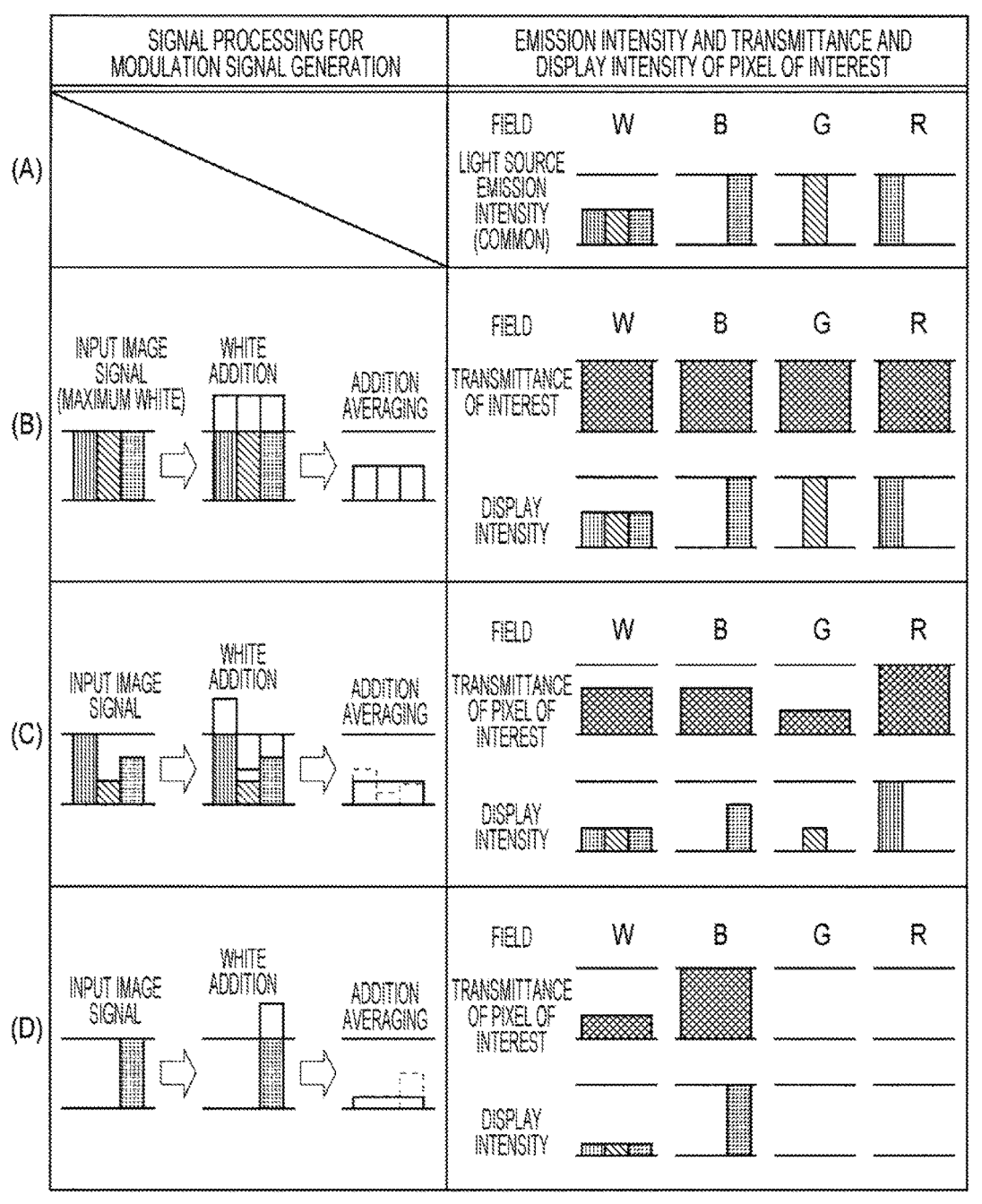

The precondition and notation for FIG. 5 are the same as those for FIGS. 7, 10, and 15 described below.

1.3.1 First Example

As shown in the left column of FIG. 5(B), the first example relates to the generation of modulation signals in a case where the input image signal contained in the input signal Din represents a maximum white display, i.e. a case where the pixel of interest is a pixel of a maximum white display. In this case, the red, green, and blue gradation values Rin, Gin, and Bin of the pixel of interest as represented by the input image signal are equal to one another, and the WBGR separation operation section 204 performs color separation whereby a white component gradation value W1, a blue coloring component gradation value B1, a green coloring component gradation value G1, and a red coloring component gradation value R1 are generated as follows (step S10):

$W1=Rin=Gin=Bin$ $B1=0$ $G1=0$ $R1=0.$

Next, the white expansion section 206a performs white expansion in which an expanded white gradation value W2=Ce·W1 is calculated from the white component gradation value W1 (step S20). Note here that Ce is the already-described ratio of white expansion.

As described above, the blue coloring component gradation value B1, the green coloring component gradation value G1, and the red coloring component gradation value R1 are "0", and then, the field distribution section 206c performs field distribution in which field gradation values Wf, Bf, Gf, and Rf are calculated as the gradation values of the pixel of interest that are to be assigned to the respective field periods Tw, Tb, Tg, and Tr (steps S30 to S50). In this first example, since the expanded white gradation value W2 is greater than the white field gradation upper limit Wlim, the field gradation values Wf, Bf, Gf, and Rf are calculated according to formulas (10) to (13) above, respectively (step S50). In this first example, since Wf=Wlim and B1=G1=R1=0, Bf=Gf=Rf=W2−Wlim.

After that, the values that the modulation signals Sw, Sb, Sg, and Sr to be supplied to the pixel array driving section 208 take on for the pixel of interest are calculated according to formulas (14) to (17) above (step S60). It should be noted that, in the first example, since the pixel of interest is a pixel of a maximum white display, the values of the modulation signals Sw, Sb, Sg, and Sr are determined so that the transmittance of the pixel of interest is at its maximum during any of the white, blue, green, and red field periods Tw, Tb, Tg, and Tr. In this way, as processing results of the first example, the pixel of interest exhibits such transmittances and display intensities as those shown in the right column of FIG. 5(B) during the white field period Tw, the blue field period Tb, the green field period Tg, and the red field period Tr.

1.3.2 Second Example

As shown in the left column of FIG. 5(C), the second example relates to the generation of modulation signals in a case where the red, green, and blue gradation values Rin, Gin, and Bin of the pixel of interest as represented by the input image signal are different from one another and the green gradation value Gin is smallest but greater than the white field gradation upper limit Wlim. In this case, the WBGR separation operation section 204 performs color separation in which a white component gradation value W1, a blue coloring component gradation value B1, a green coloring component gradation value G1, and a red coloring component gradation value R1 are generated according to formulas (1) to (4) above (step S10). Of these values, the white component gradation value W1 is given by $W1=\min(Rin,Gin,Bin)=Gin,$ and the green coloring component gradation value G1 is "0", whereas the blue coloring component gradation value B1 and the red coloring component gradation value R1 are nonzero.

Next, the white expansion section 206a performs white expansion in which an expanded white gradation value W2=Ce·W1 is calculated from the white component gradation value W1 (step S20).

Next, the field distribution section 206c performs field distribution in which field gradation values Wf, Bf, Gf, and Rf are calculated as the gradation values of the pixel of interest that are to be assigned to the respective field periods Tw, Tb, Tg, and Tr (steps S30 to S50). In this second example, since Ce>1 and W1=Gin>Wlim, the expanded white gradation value W2 is given by $$W2=Ce\cdot W1=Ce\cdot Gin>Wlim.$$

For this reason, the field gradation values Wf, Bf, Gf, and Rf are calculated according to formulas (10) to (13) above, respectively, as follows (steps S30 and S50):

$$Wf=Wlim$$

$$Bf=B1+W2-Wlim=Bin-Gin+W2-Wlim$$

$$Gf=G1+W2-Wlim=W2-Wlim$$

$$Rf=R1+W2-Wlim=Rin-Gin+W2-Wlim.$$

It should be noted that, in the second example, since the white component gradation value W1=Gin obtained as a result of the color separation is greater than the white field upper limit Wlim, the green field gradation value Gf is not "0" but "W2−Wlim".

After that, the values that the modulation signals Sw, Sb, Sg, and Sr to be supplied to the pixel array driving section 208 take on for the pixel of interest are calculated according to formulas (14) to (17) above (step S60). In this way, as processing results of the second example, the pixel of interest exhibits such transmittances and display intensities as those shown in the right column of FIG. 5(C) during the white field period Tw, the blue field period Tb, the green field period Tg, and the red field period Tr. In this second example, the transmittance of the pixel of interest during the white field period Tw takes on a maximum value.

1.3.3 Third Example

As shown in the left column of FIG. 5(D), the third example relates to the generation of modulation signals in a case where the red, green, and blue gradation values Rin, Gin, and Bin of the pixel of interest as represented by the input image signal are different from one another and the green gradation value Gin is smallest and smaller than the white field upper limit Wlim. In this case, too, as in the second example described above, color separation is performed in which a white component gradation value W1, a blue coloring component gradation value B1, a green coloring component gradation value G1, and a red coloring component gradation value R1 are generated according to formulas (1) to (4) above (step S10), and white expansion is performed in which an expanded white gradation value W2=Ce·W1 is calculated from the white component gradation value W1 (step S20). After that, field distribution is performed in which field gradation values Wf, Bf, Gf, and Rf are calculated as the gradation values of the pixel of interest that are to be assigned to the respective field periods Tw, Tb, Tg, and Tr (steps S30 to S50).

In this third example, W1=Gin<Wlim. Assume here that W2=Ce·W1=Ce·Gin, too, is smaller than the white field gradation upper limit Wlim. In this case, the field gradation values Wf, Bf, Gf, and Rf are calculated according to formulas (6) to (9) above, respectively, as follows (steps S30 and S40):

$$Wf=W2=Ce\cdot Gin$$

$$Bf=B1=Bin-Gin$$

$$Gf=G1=0$$

$$Rf=R1=Rin-Gin.$$

In this third example, unlike in the second example described above, since W2<Wlim, the green field gradation value Gf is "0".

After that, the values that the modulation signals Sw, Sb, Sg, and Sr to be supplied to the pixel array driving section 208 take on for the pixel of interest are calculated according to formulas (14) to (17) above (step S60). In this way, as processing results of the third example, the pixel of interest exhibits such transmittances and display intensities as those shown in the right column of FIG. 5(D) during the white field period Tw, the blue field period Tb, the green field period Tg, and the red field period Tr. In this third example, the transmittance of the pixel of interest during the white field period Tw does not take on a maximum value but takes on a comparatively large value (Ce·Gin/BLw). It should be noted that since, as mentioned above, the green field gradation value Gf is "0", the transmittance of the pixel of interest during the green field period Tg is "0" (nontransparent).

1.4 Effects of the First Embodiment

In the present embodiment, as described above, in a case where, as in the first and second examples described above (FIGS. 5(B) and 5(C)), the expanded white gradation value W2, which is obtained by expanding the white component of the input image signal, cannot be assigned to the white field period Tw, the white field gradation upper limit Wlim is assigned to the white field period Tw and the blue, green, and red gradation values constituting the residual white gradation value W2−Wlim are assigned to the blue field period Tb, the green field period Tg, and the red field period Tr, respectively (step S30 and S50 of FIG. 4). Further, in a case where, as in the third example described above (FIG. 5(D)), the expanded white gradation value W2 is totally assigned to the white field period Tw, the blue coloring component gradation value B1, the green coloring component gradation value G1, and the red coloring component gradation value R1 are assigned to the blue field period Tb, the green field period Tg, and the red field period Tr, respectively, so that the image is displayed by the coloring components alone.

In this way, according to the present embodiment, a white image corresponding to a white field gradation value Wf reflecting a desired target luminance is displayed during the white field period Tw, and in the case of a maximum white display, the transmittance of the liquid crystal panel 11 (transmittance of the pixel of interest) is at its maximum not only during the white field period Tw but also during the blue field period Tb, the green field period Tg, and the red field period Tr. This makes it possible to suppress color breakup by displaying a white image during the white field period Tw and make power consumption sufficiently lower than before by causing a large portion of emission energy from the backlight unit 40 to contribute to the display. Further, the maximum operation power required to achieve the maximum luminance (target luminance), which is a target specification of the present liquid crystal display device, can be sufficiently kept down. This reduces the amount of heat generation and thereby reduces the scale and cost of the power supply circuit in the present liquid crystal display device.

2. Second Embodiment

2.1 Configuration and Operation

Next, a field-sequential liquid crystal display device according to a second embodiment of the present invention is described. The liquid crystal display device according to the present embodiment is identical in overall configuration and functional configuration to that according to the first embodiment (see FIGS. 1 and 2), and the corresponding components in the two embodiments are given the same reference signs and, as such, are not described in detail below.

The present embodiment has a point of difference in the content of the modulation signal generation process for generating modulation signals Sw, Sb, Sg, and Sr from an input image signal contained in an input signal Din. That is, whereas as large a white gradation value as possible is assigned to the white field period Tw in the field distribution of the enhanced image signal by the field distribution section 206c in the first embodiment, the ratio of the white field gradation value Wf of the expanded white gradation value W2 that is to be assigned to the white field period Tw can be externally set in the present embodiment. For this purpose, the present embodiment is configured such that a white field assignment control signal Stw for designating the ratio as a ratio of white field target assignment Ctw (0<Ctw<1) can be inputted to the field distribution section 206c from an outside source as a control signal contained in the input signal Din (see the dotted signal line in FIG. 2).

Figure 6:
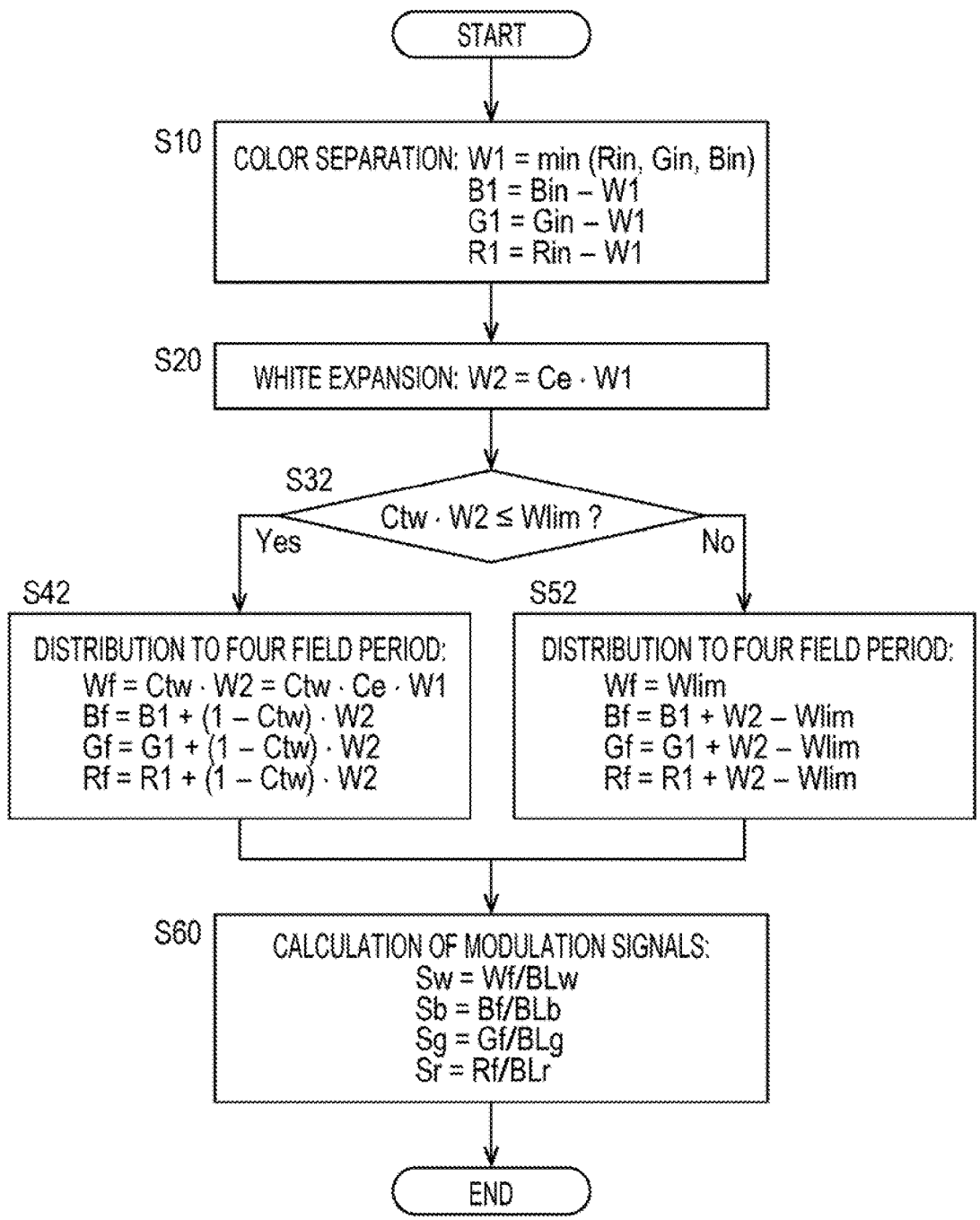
FIG. 6 is a flow chart showing a modulation signal generation process according to a second embodiment of the present invention.

FIG. 6 is a flow chart showing a procedure of a modulation signal generation process according to the present embodiment. The modulation signal generation process according to the present embodiment is described below with reference to FIG. 6 together with FIGS. 1 and 2.

In the present embodiment, too, as shown in FIG. 3, each frame period is divided into four field periods (namely white, blue, green, and red field periods Tw, Tb, Tg, and Tr). As explained in the first embodiment, the frame period on which attention is focused is referred to as "first frame period", and the frame period immediately following the first frame period is referred to as "second frame period".

As shown in FIG. 6, in the present embodiment, too, as in the modulation signal generation process according to the first embodiment, the WBGR separation operation section 204 performs color separation in which, from the blue, green, and red image signals Bin, Gin, and Rin, a white component gradation value W1, a blue coloring component gradation value B1, a green coloring component gradation value G1, and a red coloring component gradation value R1 are generated for each pixel according to formulas (1) to (4) above (step S10 of FIG. 6). After that, the white expansion section 206a performs white expansion in which the white component of the input image signal is expanded by multiplying each white component gradation value W1 by the ratio of white expansion Ce (Ce>1) (step S20).

Next, the expanded white gradation value W2, the blue coloring component gradation value B1, the green coloring component gradation value G1, and the red coloring component gradation value R1 are distributed to the white field period Tw, the blue field period Tb, the green field period Tg, and the red field period Tr. This distribution is performed so that a white gradation value of the expanded white gradation value W2 that is equivalent to the ratio of white field target assignment Ctw is assigned as much as possible to the white field period Tw. As a method for this, the field distribution section 206c performs the following process.

That is, first, the field distribution section 206c determines whether a white gradation value (hereinafter referred to as "white field gradation target value") Ctw·W2 of each expanded white gradation value W2 that is equivalent to the ratio of white field target assignment Ctw is less than or equal to the white field gradation upper limit Wlim (step S32). It should be noted that the white field gradation upper limit Wlim is equivalent to the display intensity at which the transmittance of the light crystal panel 11 is at its maximum during the white field period Tw.

In a case where, as a result of the determination, the white field gradation target value Ctw·W2 is less than or equal to the white field gradation upper limit Wlim (Ctw·W2 Wlim), the field distribution section 206c assigns the white, blue, green, and red field gradation values Wf, Bf, Gf, and Rf, represented by formulas (21) to (24) below, to the white field period Tw, the blue field period Tb, the green field period Tg, and the red field period Tr, respectively (step S42).

$$Wf = Ctw \cdot W2 = Ctw \cdot Ce \cdot W1 \quad (21)$$

$$Bf = B1 + (1-Ctw) \cdot W2 \quad (22)$$

$$Gf = G1 + (1-Ctw) \cdot W2 \quad (23)$$

$$Rf = R1 + (1-Ctw) \cdot W2 \quad (24)$$

In a case where, as a result of the determination, the white field gradation target value Ctw·W2 is greater than the white field gradation upper limit Wlim (Ctw·W2>Wlim), the field distribution section 206c assigns the white, blue, green, and red field gradation values Wf, Bf, Gf, and Rf, represented by formulas (25) to (28) below, to the white field period Tw, the blue field period Tb, the green field period Tg, and the red field period Tr, respectively (step S52).

$$Wf = Wlim \quad (25)$$

$$Bf = B1 + W2 - Wlim \quad (26)$$

$$Gf = G1 + W2 - Wlim \quad (27)$$

$$Rf = R1 + W2 - Wlim \quad (28)$$

As indicated above, in a case where the white field gradation target value Ctw·W2 is greater than the white field gradation upper limit Wlim, the field gradation values Wf, Bf, Gf, and Rf that are assigned to the respective field periods Tw, Tb, Tg, and Tr are the same as those of the first embodiment (see formulas (10) to (13) above).

After that, in accordance with the field gradation values Wf, Bf, Gf, and Rf assigned to the respective field periods, the field distribution section 206c calculates, according to the same formulas as those of the first embodiment described above, modulation signals Sw, Sb, Sg, and Sr that are to be supplied to the pixel array driving section 208 for image display during the respective field periods Tw, Tb, Tg, and Tr (step S60).

An operation in the present embodiment that follows the calculation of the modulation signals Sw, Sb, Sg, and Sr is the same as that of the first embodiment.

It should be noted that, in the present embodiment, too, the image signals Rin, Gin, and Bin stored in the image hold memory 202 are used to execute the modulation signal generation process of FIG. 6 for each pixel during each of the field periods Tw, Tb, Tg, and Tr of the second frame period, whereby a modulation signal Sx for displaying an image of the corresponding color during each frame period Tx (x=w, b, g, r) can be generated without need for a memory in which to temporarily store the white component gradation data W1 and coloring component gradation data B1, G1, and R1 and the field gradation data Wf, Bf, Gf, and Rf (see FIG. 3). In this case, however, the modulation signal generation process of FIG. 6 needs only be executed for each pixel during each field period Tx (x=w, b, g, r) such that only the white component gradation value W1 and a coloring component gradation value X1 of a color corresponding to that field period Tx are calculated in step S10, that only a field gradation value Xf of the color corresponding to that field period Tx is calculated in steps S42 and S52, and that only a modulation signal Sx of the color corresponding to that field period Tx is calculated in step S60.

2.2 Examples of the Modulation Signal Generation Process and Processing Results Thereof Next, three examples of the modulation signal generation process according to the present embodiment are described with reference to FIG. 7. It should be noted that the following description assumes that the ratio of white field target assignment Ctw is 0.5.

2.2.1 First Example

As shown in the left column of FIG. 7(B), the first example relates to the generation of modulation signals in a case where the input image signal represents a maximum white display, i.e. a case where the pixel of interest is a pixel of a maximum white display. This input image signal is the same as the input image signal of the first example according to the first embodiment. In this case, since the white field gradation target value 0.5×W2 is greater than the white field gradation upper limit Wlim (0.5×W2>Wlim), the field distribution section 206c performs a process of the same content. For this reason, as processing results of the first example, the pixel of interest exhibits such transmittances and display intensities as those shown in the right column of FIG. 7(B) during the white field period Tw, the blue field period Tb, the green field period Tg, and the red field period Tr, as in the first example according to the first embodiment.

2.2.2 Second Example

As shown in the left column of FIG. 7(C), the second example relates to the generation of modulation signals in a case where the red, green, and blue gradation values Rin, Gin, and Bin of the pixel of interest as represented by the input image signal are different from one another and the green gradation value Gin is smallest but greater than the white field upper limit Wlim. This input image signal is the same as the input image signal of the second example according to the first embodiment. In the second example according to the present embodiment, the white field gradation target value 0.5×W2 is slightly smaller than the white field gradation upper limit Wlim (0.5×W2<Wlim). In this case, the field gradation values Wf, Bf, Gf, and Rf are calculated according to formulas (21) to (24) above, respectively, as follows (steps S32 and S42):

$Wf=0.5\times W2=0.5\times Ce\cdot W1$ $Bf=B1+0.5\times W2$ $Gf=G1+0.5\times W2$ $Rf=R1+0.5\times W2.$ In the result, as shown in the right column of FIG. 7(C), the transmittance of the pixel of interest as indicated by the value of the modulation signal Sw calculated according to formula (21) above is less than or equal to its maximum value and, as such, is slightly lower than the transmittance of the pixel of interest in the second example according to the first embodiment. For this reason, in the second example according to the present embodiment, the transmittance of the pixel of interest during the white field period Tw is slightly lower and the transmittances of the pixel of interest during the blue field period Tb, the green field period Tg, and the red field period Tr are slightly higher (right column of FIG. 7(C)) than they are in the second example according to the first embodiment (right column of FIG. 5(C)).

2.2.3 Third Example

As shown in the left column of FIG. 7(D), the third example relates to the generation of modulation signals in a case where the red, green, and blue gradation values Rin, Gin, and Bin of the pixel of interest as represented by the input image signal are different from one another and the green gradation value Gin is smallest and smaller than the white field upper limit Wlim. This input image signal is the same as the input image signal of the third example according to the first embodiment. In this case, too, since the white field gradation target value 0.5×W2 is slightly smaller than the white field gradation upper limit Wlim (0.5×W2<Wlim), field gradation values Wf, Bf, Gf, and Rf are calculated according to formulas (21) to (24) above, respectively (steps S32 and S42).

In the result, as shown in the right column of FIG. 7(D), the transmittance of the pixel of interest as indicated by the value of the modulation signal Sw calculated according to formula (21) above is lower than the transmittance of the pixel of interest in the third example (right column of FIG. 5(D)) according to the first embodiment. For this reason, in the third example according to the present embodiment, the transmittance of the pixel of interest during the white field period Tw is lower and the transmittances of the pixel of interest during the blue field period Tb, the green field period Tg, and the red field period Tr are higher (right column of FIG. 7(D)) than they are in the third example according to the first embodiment.

2.3 Effects of the Second Embodiment

In the present embodiment, as described above, in a case where, as in the first example described above (FIG. 7(B)), the white field gradation target value 0.5×W2 based on the white component of the input image signal after white expansion cannot be assigned to the white field period Tw, as in the first embodiment (FIG. 5(B)), the white field gradation upper limit Wlim is assigned to the white field period Tw and the blue, green, and red gradation values constituting the residual white gradation value W2−Wlim are assigned to the blue field period Tb, the green field period Tg, and the red field period Tr, respectively (step S32 and S52 of FIG. 6). Meanwhile, in a case where, as in the second and third examples described above (FIGS. 7(C) and 7(D)), the white field gradation target value 0.5×W2 is totally assigned to the white field period Tw, the blue coloring component gradation value B1, the blue field gradation value B1+0.5×W2, the green field gradation value G1+0.5×W2, and the red field gradation value R1+0.5×W2 are assigned to the blue field period Tb, the green field period Tg, and the red field period Tr, respectively (step S42 of FIG. 6), so that the image is displayed at gradation values obtained by adding the gradation value 0.5×W2 to the coloring components B1, G1, and R1.

In this way, according to the present embodiment, a white image corresponding to a white field gradation value Wf reflecting a desired target luminance is displayed during the white field period Tw, and in the case of a maximum white display, the transmittance of the liquid crystal panel 11 (transmittance of the pixel of interest) is at its maximum not only during the white field period Tw but also during the blue field period Tb, the green field period Tg, and the red field period Tr (right column of FIG. 7(B)). This brings about the same effects as those brought about by the first embodiment. In addition, according to the present embodiment, the proportion of assignment of the white component of the input image signal after white expansion (expanded white gradation value W2) does not greatly vary depending on the input image signal between the white field period Tw and the blue, green, and red field periods Tb, Tg, and Tr. This reduces a sense of incongruity that is effected by a variation in the proportion of assignment of the white component to each field period depending on the input image signal.

The foregoing description assumes that the ratio of white field target assignment Ctw is 0.5; however, the ratio of white field target assignment Ctw may take on a value other than 0.5, provided the value does not cause the proportion to greatly vary depending on the input image signal. However, it is preferable that the ratio of white field target assignment Ctw be set at such a large value that color breakup can be effectively suppressed by displaying a white image during the white field period Tw.

It should be noted that although the present embodiment is configured such that the ratio of white field target assignment Ctw be set at a desired value by the white field assignment control signal Stw, which is supplied from an outside source, the present embodiment may alternatively be configured such that a value that is suitable as the ratio of white field target assignment Ctw is determined in advance by an experiment, a computer simulation, or the like and the ratio of white field target assignment Ctw is fixed at the value thus determined.

3. Third Embodiment

3.1 Configuration and Operation

Figure 8:
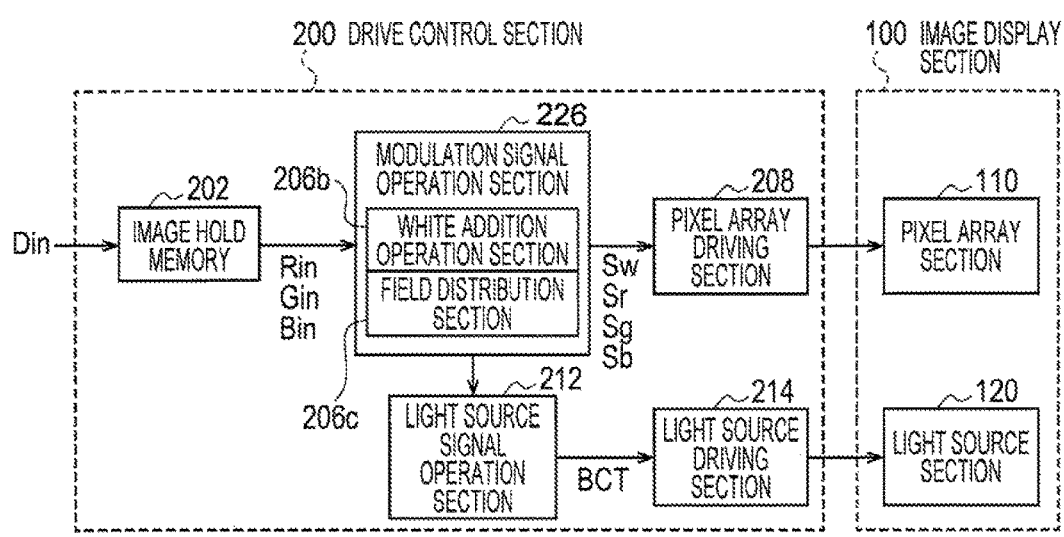
FIG. 8 is a block diagram showing a functional configuration of a liquid crystal display device according to a third embodiment of the present invention.

Next, a field-sequential liquid crystal display device according to a third embodiment of the present invention is described. The liquid crystal display device according to the present embodiment is identical in overall configuration to that according to the first embodiment as shown in FIG. 1. FIG. 8 is a block diagram showing a functional configuration of the liquid crystal display device according to the present embodiment. As in the first embodiment (FIG. 2), from a functional standpoint, this liquid crystal display device is comprising of an image display section 100 and a drive control section 200. The image display section 100 includes a pixel array section 110 and a light source section 120, and the drive control section 200 includes an image hold memory 202, a modulation signal operation section 226, a pixel array driving section 208, a light source signal operation section 212, and a light source driving section 214. However, unlike in the first embodiment, this liquid crystal display device does not include a WBGR separation operation section, and an input signal Din from an outside source is supplied to and temporarily stored in the image hold memory 202. Further, according to the present embodiment, as in the first embodiment, the modulation signal operation section 226 includes a field distribution section 206c, but unlike in the first embodiment, the modulation signal operation section 226 includes a white addition operation section 206b instead of the white expansion section 206a.

In the present embodiment, too, as shown in FIG. 3, each frame period is divided into four field periods (namely white, blue, green, and red field periods Tw, Tb, Tg, and Tr). As explained in the first embodiment, the frame period on which attention is focused is referred to as "first frame period", and the frame period immediately following the first frame period is referred to as "second frame period".

Figure 9:
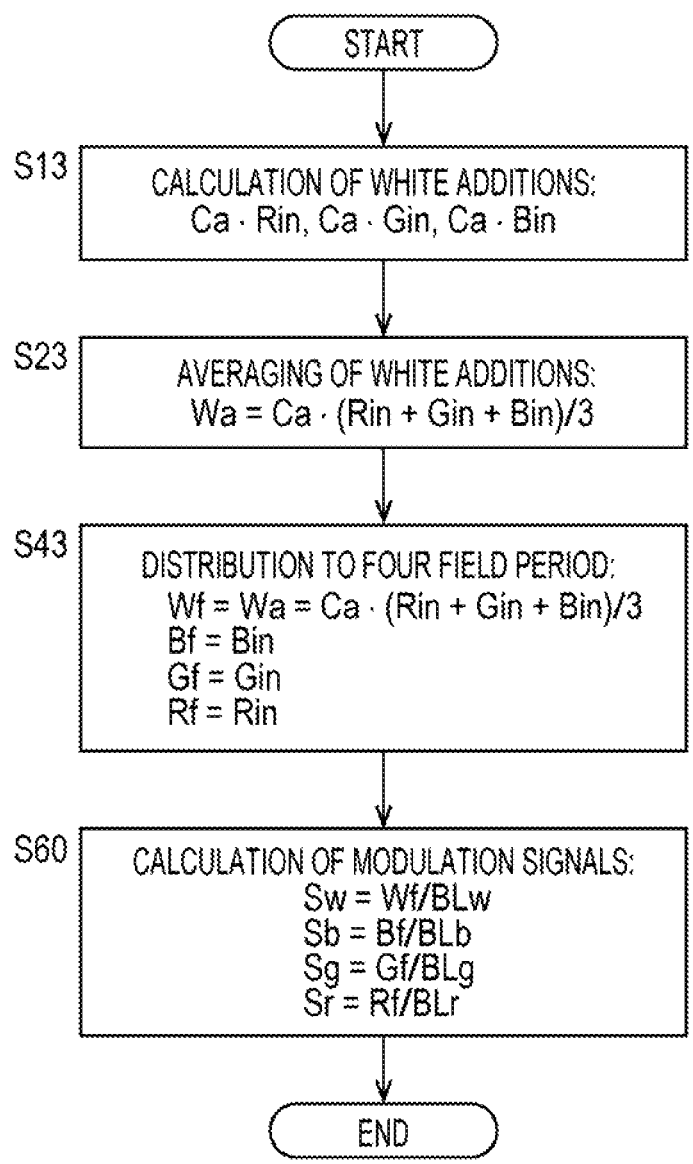
FIG. 9 is a flow chart showing a procedure of a modulation signal generation process according to the third embodiment.

FIG. 9 is a flow chart showing a procedure of a modulation signal generation process according to the present embodiment. The modulation signal generation process according to the present embodiment is described below with reference to FIG. 9 together with FIG. 8.

Red, green, and blue image signals Rin, Gin, and Bin constituting an input image signal contained in an input signal Din received from an outside source in the first frame period are temporarily stored in the image hold memory 202 and read out by the modulation signal operation section 226 to generate modulation signals Sw, Sb, Sg, and Sr for displaying images during the respective field period of the second frame period.

The white addition operation section 206b of the modulation signal operation section 226 calculates a first white addition value Ca·Rin, a second white addition value Ca·Gin, and a third white addition value Ca·Bin as values of the white component that are to be added according to input red, green, and blue gradation values Rin, Gin, and Bin respectively represented by the red, green, and blue image signals Rin, Gin, and Bin thus read out (step S13 of FIG. 9). Note here that the ratio Ca is a ratio for enhancing the white component of the input image signal and is determined in advance in consideration of the emission intensity of the light source during each field period so that when the transmittance of the liquid crystal panel 11 is at its maximum during all of the field periods Tw, Tb, Tg, and Tr in a case where the input image signal represents a maximum white display, the liquid crystal panel 11 can achieve a target luminance that should correspond to the maximum white display. This ratio Ca is equivalent to a ratio obtained by subtracting 1 from the ratio of white enhancement (>1) for appropriately controlling a display state with respect to the input image signal. This ratio Ca is hereinafter referred to as "ratio of white addition".

Next, the white addition operation section 206b calculates an additional white gradation value Wa by averaging the first to third addition values Ca·Rin, Ca·Gin, and Ca·Bin. That is, the white addition operation section 206b calculates the additional white gradation value Wa according to the following formula (step S23):

$$Wa = Ca \cdot (Rin + Gin + Bin)/3 \qquad (31)$$

In the present embodiment, the generation of such an additional white gradation value Wa results in the generation of an enhanced image signal constituted by the additional white gradation value Wa and the input red, green, and blue gradation values Rin, Gin, and Bin for each pixel.

Next, the field distribution section 206c distributes the enhanced image signal, constituted by the additional white gradation value Wa, the input red gradation value Rin, the input green gradation value Gin, and the input blue gradation value Bin for each pixel, to each of the field periods Tw, Tb, Tg, and Tr. That is, the field distribution section 206c determines, according to formulas (32) to (35) below, the white, blue, green, and red field gradation values Wf, Bf, Gf, and Rf that are to be assigned to the white, blue, green, and red field periods Tw, Tb, Tg, and Tr, respectively (step S43):

$$Wf=Wa-Ca\cdot(Rin+Gin+Bin)/3 \qquad (32)$$

$$Bf=Bin \qquad (33)$$

$$Gf=Gin \qquad (34)$$

$$Rf=Rin \qquad (35)$$

After that, in accordance with the field gradation values Wf, Bf, Gf, and Rf assigned to the respective field periods Tw, Tb, Tg, and Tr, the field distribution section 206c calculates, according to the same formulas as those of the first embodiment, modulation signals Sw, Sb, Sg, and Sr that are to be supplied to the pixel array driving section 208 for image display during the respective field periods of the second frame period (step S60).

An operation in the present embodiment that follows the calculation of the modulation signals Sw, Sb, Sg, and Sr is the same as that of the first embodiment.

It should be noted that, in the present embodiment, too, the image signals Rin, Gin, and Bin stored in the image hold memory 202 are used to execute the modulation signal generation process of FIG. 9 for each pixel during each of the field periods Tw, Tb, Tg, and Tr of the second frame period, whereby a modulation signal Sx for displaying an image of the corresponding color during each frame period Tx (x=w, b, g, r) can be generated without need for a memory in which to temporarily store the white component gradation data W1 and coloring component gradation data B1, G1, and R1 and the field gradation data Wf, Bf, Gf, and Rf (see FIG. 3). In this case, however, the modulation signal generation process of FIG. 9 needs only be executed for each pixel during the white field period Tw such that only the white field gradation value Wf is calculated in step S43 and that only the white modulation signal Sw is calculated in step S60. Further, the modulation signal generation process of FIG. 9 needs only be executed for each pixel during each field period Tx (x=b, g, r) of the blue, green, and red field periods Tb, Tg, and Tr such that only step S60 is executed and, in step S60, only a modulation signal Sx=Xf/BLx=Xin/BLx of the color corresponding to that field period Tx is calculated. For example, the modulation signal generation process of FIG. 9 needs only be executed for each pixel during the blue field period Tb such that only a blue modulation signal Sb=Bin/BLb is calculated.

3.2 Examples of the Modulation Signal Generation Process and Processing Results Thereof Next, three examples of the modulation signal generation process according to the present embodiment are described with reference to FIG. 10.

3.2.1 First Example

As shown in the left column of FIG. 10(B), the first example relates to the generation of modulation signals in a case where the input image signal represents a maximum white display, i.e. a case where the pixel of interest is a pixel of a maximum white display. This input image signal is the same as the input image signal of the first example according to the first embodiment. In this case, the field gradation values Wf, Bf, Gf, and Rf are calculated according to formulas (32) to (35) above, respectively. In consideration of the already-described definition of the ratio of white addition Ca, the transmittance of the pixel of interest is at its maximum during all of the field periods Tw, Tb, Tg, and Tr. As in the first embodiment, the pixel of interest exhibits such transmittances and display intensities as those shown in the right column of FIG. 10(B) during the field periods Tw, Tb, Tg, and Tr.

3.2.2 Second Example

As shown in the left column of FIG. 10(C), the second example relates to the generation of modulation signals in a case where the red, green, and blue gradation values Rin, Gin, and Bin of the pixel of interest as represented by the input image signal are different from one another and the green gradation value Gin is smallest. In this case, too, the field gradation values Wf, Bf, Gf, and Rf are calculated according to formulas (32) to (35) above, respectively. In consideration of the already-described definition of the ratio of white addition Ca, the white field gradation value Wf does not exceed the white field gradation upper limit Wlim. In this second example, the pixel of interest exhibits such transmittances and display intensities as those shown in the right column of FIG. 10(C) during the field periods Tw, Tb, Tg, and Tr.

3.2.3 Third Example

As shown in the left column of FIG. 10(D), the third example relates to the generation of modulation signals in a case where the input image signal represents a maximum blue display that is one of the maximum monochromatic displays, i.e. a case where the pixel of interest is a pixel of a maximum blue display. In this case, since the red, green, and blue gradation values Rin, Gin, and Bin of the pixel of interest as represented by the input image signal are "0" except for the blue gradation value Bin (Rin=Gin=0), such processes of white addition and addition averaging as those shown in the left column of FIG. 10(D) are performed in sequence. After that, in the field distribution process, the field gradation values Wf, Bf, Gf, and Rf are calculated according to formulas (32) to (35) above as follows (step S43 of FIG. 9):

$$Wf=Ca\cdot Bin/3$$

$$Bf=Bin$$

$$Gf=0$$

$$Rf=0.$$

On the basis of these field gradation values Wf, Bf, Gf, and Rf, modulation signals Sw, Sb, Sg, and Sr representing the transmittance of the pixel of interest during the respective field periods Tw, Tb, Tg, and Tr of the second frame period are calculated. On the basis of the modulation signals Sw, Sb, Sg, and Sr thus calculated, the pixel of interest exhibits such transmittances and display intensities as those shown in the right column of FIG. 10(D) during the respective field periods Tw, Tb, Tg, and Tr. In this case, the transmittance of the pixel of interest is "0" (nontransparent) during the red field period Tr and the green field period Tg and is at its maximum value during the blue field period Tb. The transmittance of the pixel of interest during the white field period Tw takes on a value (nonzero) corresponding to the white addition gradation value Wa.

3.3 Effects of the Third Embodiment

In the present embodiment, as described above, in a case where, as in the first example described above (FIG. 10(B)), the input image signal represents a maximum white display, the transmittance and display intensity of the pixel of interest during each field period take on the same results as in the first and second embodiments (FIG. 5(B) and FIG. 7(B)). That is, a white image corresponding to a white field gradation value Wf reflecting a desired target luminance is displayed during the white field period Tw, and in the case of a maximum white display, the transmittance of the liquid crystal panel 11 (transmittance of the pixel of interest) is at its maximum not only during the white field period Tw but also during the blue field period Tb, the green field period Tg, and the red field period Tr (right column of FIG. 10(B)). This brings about the same effects as those brought about by the first embodiment.

Incidentally, in a common display, the sum of display luminances in the case of an input image signal representing the respective maximum monochromatic displays of red, green, and blue (such a sum being hereinafter referred to as "maximum monochromatic display luminance sum") coincides with the luminance of a display in the case of an input image signal representing a maximum white display (such luminance being hereinafter referred to as "maximum white display luminance"). This means that an additive color mixing property is ensured. When this additive color mixing property is no longer maintained, a sense of incongruity may be felt especially in a display of a natural image.

In the first and second embodiments, in a case where the input image signal represents a maximum monochromatic display, the WBGR separation operation section 204 yields a white component gradation value W1 of "0" (see step S10 of each of FIGS. 4 and 6); therefore, the maximum white display luminance exceeds the maximum monochromatic display luminance sum (that is, the additive color mixing property is not maintained). Therefore, the present embodiment, which ensures the additive color mixing property, can be said to be more advantageous than the first and second embodiments in terms of being able to reduce the sense of incongruity.

4. Fourth Embodiment

4.1 Configuration and Operation

Figure 11:
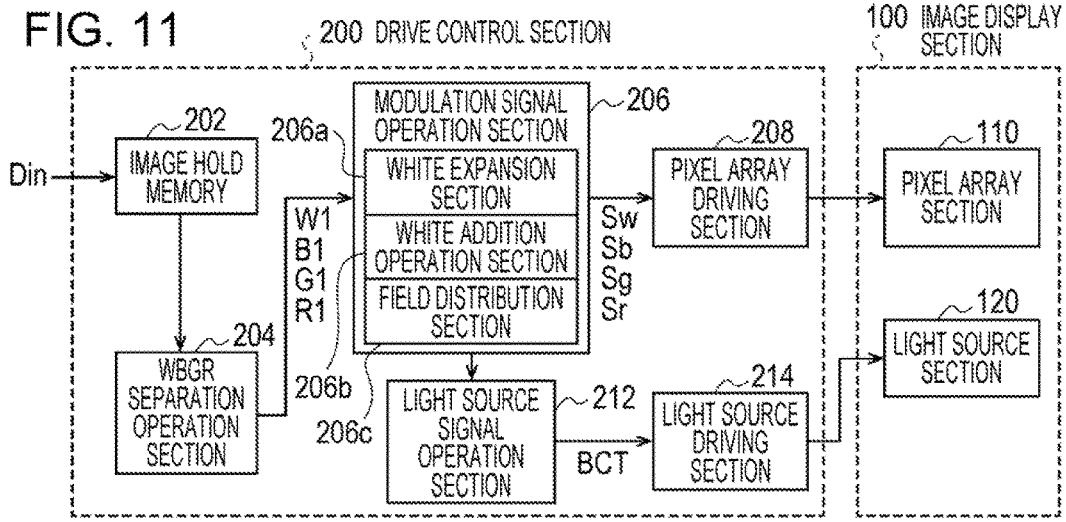
FIG. 11 is a block diagram showing a first example configuration of a fourth embodiment of the present invention.
Figure 12:
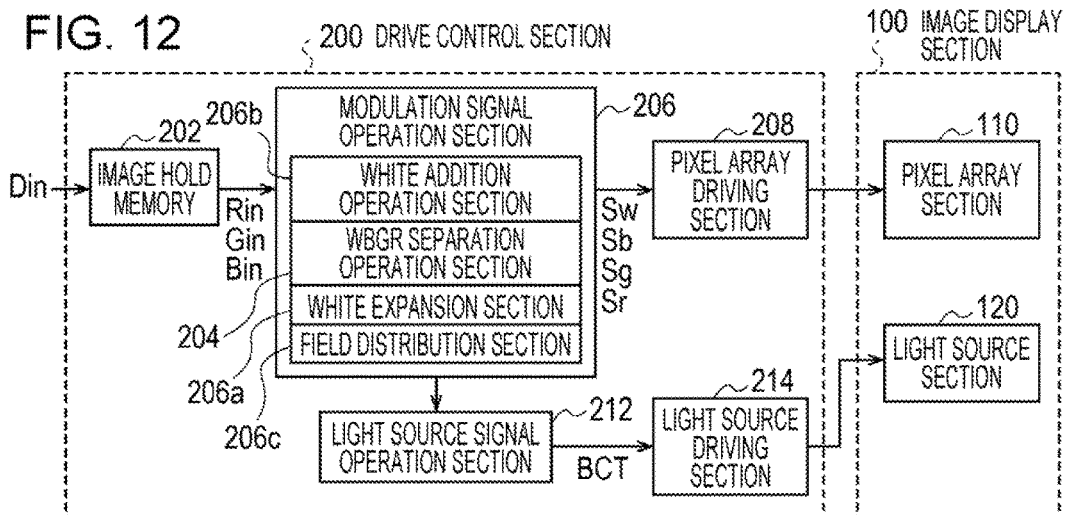
FIG. 12 is a block diagram showing a second example configuration of the fourth embodiment.
Figure 13:
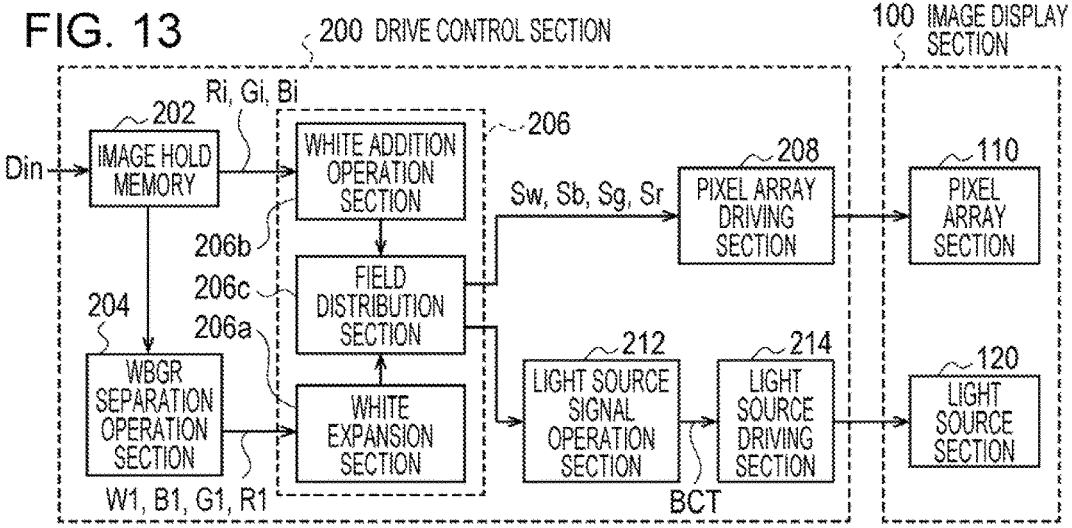
FIG. 13 is a block diagram showing a third example configuration of the fourth embodiment.

Next, a field-sequential liquid crystal display device according to a fourth embodiment of the present invention is described. In the present embodiment, both the white expansion (step S20 of FIG. 4) according to the first embodiment and the white addition (steps S13 and S23 of FIG. 9) according to the third embodiment are performed on an input image signal contained in an input signal Din. For this purpose, the liquid crystal display device according to the present embodiment includes a modulation signal operation section including both a white expansion section and a white addition operation section. FIG. 11 is a block diagram showing a first example of a functional configuration (hereinafter referred to as "first example configuration") of such a liquid crystal display device according to the present embodiment. FIG. 12 is a block diagram showing a second example of a functional configuration (hereinafter referred to as "second example configuration") of such a liquid crystal display device according to the present embodiment. FIG. 13 is a block diagram showing a third example of a functional configuration (hereinafter referred to as "third example configuration") of such a liquid crystal display device according to the present embodiment. In the first example configuration, after the white expansion section 206a of the modulation signal operation section 206 has performed a process, the white addition operation section 206b of the modulation signal operation section 206 performs a process. In the second example configuration, after the white addition operation section 206b of the modulation signal operation section 206 has performed a process, the WBGR separation operation section 204 performs a process and then the white expansion section 206a of the modulation signal operation section 206 performs a process. In the third example configuration, the white expansion section 206a and the white addition operation section 206b of the modulation signal operation section 206 perform processes in parallel.

In the present embodiment, too, as shown in FIG. 3, each frame period is divided into four field periods (namely white, blue, green, and red field periods Tw, Tb, Tg, and Tr). As explained in the first embodiment, the frame period on which attention is focused is referred to as "first frame period", and the frame period immediately following the first frame period is referred to as "second frame period".

Figure 14:
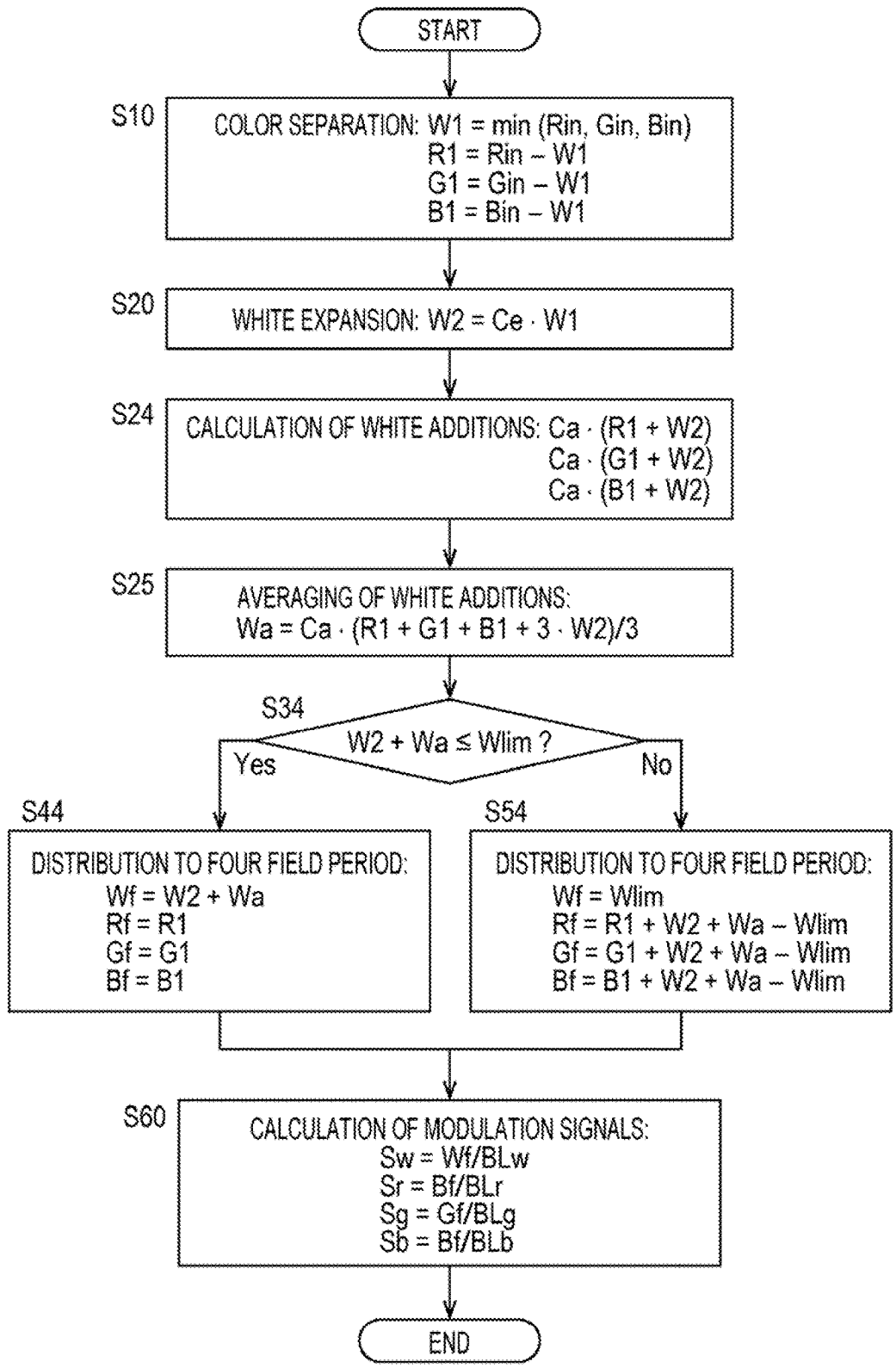
FIG. 14 is a flow chart showing a first example procedure of a modulation signal generation process according to the first example configuration of the fourth embodiment.

FIG. 14 is a flow chart showing a first example of a procedure (hereinafter referred to as "first example procedure") of a modulation signal generation process according to the first example configuration of the present embodiment. The modulation signal generation process according to the present embodiment is described below with reference to FIGS. 11 and 14, with attention focused on the first example configuration.

As shown in FIG. 11, the liquid crystal display device of the first example configuration is basically the same as that according to the first embodiment; therefore, the corresponding components in the two embodiments are given the same reference signs and, as such, are not described in detail below. The liquid crystal display device of the first example configuration of the present embodiment differs from that according to the first embodiment in that the modulation signal operation section 206 of the drive control section 200 includes the white addition operation section 206b in addition to the white expansion section 206a.

In the first example configuration, as in the first embodiment, red, green, and blue image signals Rin, Gin, and Bin constituting an input image signal contained in an input signal Din received from an outside source in the first frame period are first stored in the image hold memory 202. Next, from input red, green, and blue gradation values Rin, Gin, and Bin respectively represented by the red, green, and blue image signals Rin, Gin, and Bin stored in the image hold memory 202, the WBGR separation operation section 204 generates a white component gradation value W1, a red coloring component gradation value R1, a green coloring component gradation value G1, and a blue coloring component gradation value B1 for each pixel according to formulas (1) to (4) above (step S10 of FIG. 14).

The modulation signal operation section 206 performs the following processes in sequence through the white expansion section 206a, the white addition operation section 206b, and the field distribution section 206c in accordance with the white component gradation value W1, the blue coloring component gradation value B1, the green coloring component gradation value G1, and the red coloring component gradation value R1, thereby calculating a white field gradation value Wf, a red field gradation value Rf, a green field gradation value Gf, and a blue field gradation value Bf for each pixel and generating modulation signals Sw, Sb, Sg, and Sr in accordance with these four field gradation values Wf, Bf, Gf, and Rf.

The white expansion section 206a calculates an expanded white gradation value W2 from the white component gradation value W1 according to formula (5) above with use of the ratio of white expansion Ce (step S20).

Next, the white addition operation section 206b calculates, with use of the ratio of white addition Ca, first to third white addition values Ca·(R1+W2), Ca·(G1+W2), Ca·(B1+W2) corresponding in magnitude to red, green, blue gradation values R1+W2, G1+W2, and B1+W2 after the white expansion (step S24 of FIG. 14) and, by averaging the first to third white addition values Ca·(R1+W2), Ca·(G1+W2), Ca·(B1+W2) according to formula (41) below, calculates an additional white gradation value Wa (step S25).

$$Wa = Ca(R1+G1+B1+3 \cdot W2)/3 \quad (41)$$

Note here that the ratio of white expansion Ce and the ratio of white addition Ca are each a ratio for enhancing the white component of the input image signal and are each determined in advance in consideration of the emission intensity of the light source during each field period so that when the transmittance of the liquid crystal panel 11 is at its maximum in a case where the input image signal represents a maximum white display, the liquid crystal panel 11 can achieve a target luminance that should correspond to the maximum white display. That is, the ratio of white expansion Ce and the ratio of white addition Ca are determined in advance on the basis of the ratio of white enhancement for appropriately controlling a display state of the input image signal. It should be noted that, in the present embodiment, the generation of the additional white gradation value Wa in addition to the generation of the expanded white gradation value W2 results in the generation of an enhanced image signal constituted by an enhanced white gradation value W2+Wa, which is the sum of the expanded white gradation value W2 and the additional white gradation value Wa, the red coloring component gradation value R1, the green coloring component gradation value G1, and the blue coloring component gradation value B1 for each pixel.

Next, the field distribution section 206c distributes the enhanced image signal, constituted by the enhanced white gradation value W2+Wa, the red coloring component gradation value R1, the green coloring component gradation value G1, and the blue coloring component gradation value B1 for each pixel, to each of the field periods Tw, Tb, Tg, and Tr (steps S34 to S54).

That is, the field distribution section 206c first determines whether the enhanced white gradation value W2+Wa is less than or equal to the white field gradation upper limit Wlim (step S34). In a case where, as a result of the determination, the enhanced white gradation value W2+Wa is less than or equal to the white field gradation upper limit Wlim (W2+Wa≤Wlim), the field distribution section 206c assigns the white, blue, green, and red field gradation values Wf, Bf, Gf, and Rf, represented by formulas (42) to (45) below, to the white field period Tw, the blue field period Tb, the green field period Tg, and the red field period Tr, respectively (step S44).

$$Wf = W2+Wa \quad (42)$$

$$Bf = B1 \quad (43)$$

$$Gf = G1 \quad (44)$$

$$Rf = R1 \quad (45)$$

In a case where, as a result of the determination, the enhanced white gradation value W2+Wa is greater than the white field gradation upper limit Wlim (W2+Wa>Wlim), the field distribution section 206c assigns the white, blue, green, and red field gradation values Wf, Bf, Gf, and Rf, represented by formulas (46) to (49) below, to the white field period Tw, the blue field period Tb, the green field period Tg, and the red field period Tr, respectively (step S54).

$$Wf = Wlim \quad (46)$$

$$Bf = B1+W2+Wa-Wlim \quad (47)$$

$$Gf = G1+W2+Wa-Wlim \quad (48)$$

$$Rf = R1+W2+Wa-Wlim \quad (49)$$

Note here that the residual white gradation value "W2−Wa−Wlim" obtained by subtracting the white field gradation value Wf=Wlim from the enhanced white gradation value W2+Wa is equivalent to a combination of red, green, and blue gradation values having the same value "W2+Wa−Wlim". For this reason, as indicated by formulas (47) to (49) above, each of the gradation values of the coloring components, namely the red field gradation value Rf, the green field gradation value Gf, and the blue field gradation value Bf, includes the residual white gradation value W2+Wa−Wlim.

In accordance with the field gradation values Wf, Bf, Gf, and Rf thus assigned to the respective field periods, the field distribution section 206c calculates, according to formulas (14) to (17) above, modulation signals Sw, Sb, Sg, and Sr that are to be supplied to the pixel array driving section 208 for image display during the respective field periods (step S60).

It should be noted that, in the present example configuration of the present embodiment, too, the image signals Rin, Gin, and Bin stored in the image hold memory 202 are used to execute the modulation signal generation process of FIG. 14 for each pixel during each of the field periods Tw, Tb, Tg, and Tr of the second frame period, whereby a modulation signal Sx for displaying an image of the corresponding color during each frame period Tx (x=w, b, g, r) can be generated without need for a memory in which to temporarily store the white component gradation data W1 and coloring component gradation data B1, G1, and R1 and the field gradation data Wf, Bf, Gf, and Rf (the same applies to the second and third example configurations described below). In this case, however, the modulation signal generation process of FIG. 14 needs only be executed for each pixel during each field period Tx (x=w, b, g, r) such that only a field gradation value Xf of the color corresponding to that field period Tx is calculated in steps S44 and S54 and that only a modulation signal Sx of the color corresponding to that field period Tx is calculated in step S60.

4.2 Examples of the Modulation Signal Generation Process According to the First Example Configuration and Processing Results Thereof Next, three examples of the modulation signal generation process according to the first example configuration of the present embodiment are described with reference to FIG. 15.

4.2.1 First Example

As shown in the left column of FIG. 15(B), the first example relates to the generation of modulation signals in a case where the input image signal represents a maximum white display, i.e. a case where the pixel of interest is a pixel of a maximum white display. This input image signal is the same as the input image signal of the first example according to the first embodiment. In this case, such processes of color separation (step S10 of FIG. 14), white expansion (step S20), white addition (step S24), addition averaging (step S25), field distribution (steps S34 and S54) as those shown in the left column of FIG. 15(B) are performed in sequence on the red, green, and blue gradation values Rin, Gin, Bin of the pixel of interest as represented by the input image signal. In the result, the field gradation values Wf, Bf, Gf, and Rf represented by formulas (46) to (49) above are obtained, and on the basis of these field gradation values Wf, Bf, Gf, and Rf, modulation signals Sw, Sb, Sg, and Sr representing the transmittance of the pixel of interest during the respective field periods are calculated (step S60). In consideration of the already-described definitions of the ratio of white expansion Ce and the ratio of white addition Ca, the transmittance of the pixel of interest is at its maximum during all of the field periods. As in the first embodiment, the pixel of interest exhibits such transmittances and display intensities as those shown in the right column of FIG. 15(B) during the field periods Tw, Tb, Tg, and Tr.

4.2.2 Second Example

As shown in the left column of FIG. 15(C), the second example relates to the generation of modulation signals in a case where the red, green, and blue gradation values Rin, Gin, and Bin of the pixel of interest as represented by the input image signal are different from one another and the green gradation value Gin is smallest. In this case, too, as shown in the left column of FIG. 15(C), the processes of color separation, white expansion, white addition, addition averaging, and field distribution are performed in sequence. In this case, too, since, as in the first example described above, the enhanced white gradation value W2+Wa is greater than the white field gradation upper limit Wlim, the field gradation values Wf, Bf, Gf, and Rf represented by formulas (46) to (49) are obtained (step S54), and on the basis of these field gradation values Wf, Bf, Gf, and Rf, modulation signals Sw, Sb, Sg, and Sr representing the transmittance of the pixel of interest during the respective field periods are calculated. On the basis of the modulation signals Sw, Sb, Sg, and Sr thus calculated, the pixel of interest exhibits such transmittances and display intensities as those shown in the right column of FIG. 15(C) during the respective field periods. The transmittance of the pixel of interest during the white field period Tw takes on a maximum value.

4.2.3 Third Example

As shown in the left column of FIG. 15(D), the third example relates to the generation of modulation signals in a case where the input image signal represents a maximum blue display that is one of the maximum monochromatic displays, i.e. a case where the pixel of interest is a pixel of a maximum blue display. In this case, the red, green, and blue gradation values Rin, Gin, and Bin of the pixel of interest as represented by the input image signal are "0" except for the blue gradation value Bin (Rin=Gin=0); therefore, as shown in the left column of FIG. 15(D), the expanded white gradation value W2 obtained by the process of white expansion (step S20) is "0", and the white gradation value increases solely by the additional white gradation value Wa generated by the processes of calculation and averaging of white additions (steps S24 and S25). Note, however, that, in consideration of the above-described definitions of the ratio of white expansion Ce and the ratio of white addition Ca, the ratio of white addition Ca is smaller than it is in the third embodiment and therefore the additional white gradation value Wa is small, too. In this case, since the enhanced white gradation value W2+Wa=Wa=Ca·(Rin+Gin+Bin)/3 is smaller than the white field gradation upper limit Wlim, the field gradation values Wf, Bf, Gf, and Rf are calculated according to formulas (42) to (45) above as follows (step S44):

$Wf=Ca·Bin/3$ $Bf=Bin$ $Gf=0$ $Rf=0.$

On the basis of these field gradation values Wf, Bf, Gf, and Rf, modulation signals Sw, Sb, Sg, and Sr representing the transmittance of the pixel of interest during the respective field periods Tw, Tb, Tg, and Tr are calculated. On the basis of the modulation signals Sw, Sb, Sg, and Sr thus calculated, the pixel of interest exhibits such transmittances and display intensities as those shown in the right column of FIG. 15(D) during the respective field periods. In this case, the transmittance of the pixel of interest is "0" (nontransparent) during the red field period Tr and the green field period Tg and is at its maximum value during the blue field period Tb. The transmittance of the pixel of interest during the white field period Tw is not "0" but takes on a comparatively small value. This is because the ratio of white addition Ca is smaller than it is in the third embodiment.

4.3 Effects of the Fourth Embodiment

In the present embodiment, as described above, in a case where, as in the first example described above (FIG. 15(B)), the input image signal represents a maximum white display, the transmittance and display intensity of the pixel of interest during each field period take on the same results as in the first and second embodiments (FIG. 5(B) and FIG. 7(B)). That is, a white image corresponding to a white field gradation value Wf reflecting a desired target luminance is displayed during the white field period Tw, and in the case of a maximum white display, the transmittance of the liquid crystal panel 11 (transmittance of the pixel of interest) is at its maximum not only during the white field period Tw but also during the blue field period Tb, the green field period Tg, and the red field period Tr (right column of FIG. 15(B)). This brings about the same effects as those brought about by the first embodiment.

In the third embodiment, as described above, the sum of display luminances in the case of an input image signal representing the respective maximum monochromatic displays of red, green, and blue (maximum monochromatic display luminance sum) and the luminance of a display in the case of an input image signal representing a maximum white display (maximum white display luminance) coincide with each other, whereby an additive color mixing property is ensured. In the third embodiment, however, since a comparative large white addition is performed even in the case of an input image signal representing a monochromatic display (step S23 of FIG. 9, right column of FIG. 10(D)), there is undesirably a decrease in color purity in the case of a monochromatic display. On the other hand, the present embodiment makes the additional white gradation value Wa, which is equivalent to the amount of white addition, comparatively smaller (step S44 of FIG. 14, right column of FIG. 15(D)), thus suppressing a decrease in color purity in the case of a monochromatic display. Further, the present embodiment, in which the white component of the input image signal is enhanced by a combination of white expansion and white addition (FIG. 11, steps S20 to S54 of FIG. 14), is smaller in difference between the maximum monochromatic display luminance sum and the maximum white display luminance than the first and second embodiments, in which the white component of the input image signal is enhanced by white expansion alone. Therefore, the present embodiment is more advantageous than the third embodiment in term of suppressing the decrease in color purity in the case of a monochromatic display and more advantageous than the first and second embodiments in terms of maintaining the additive color mixing property.

4.4 Other Example Configurations of the Fourth Embodiment and Another Example Procedure of the Modulation Signal Generation Process

Figure 16:
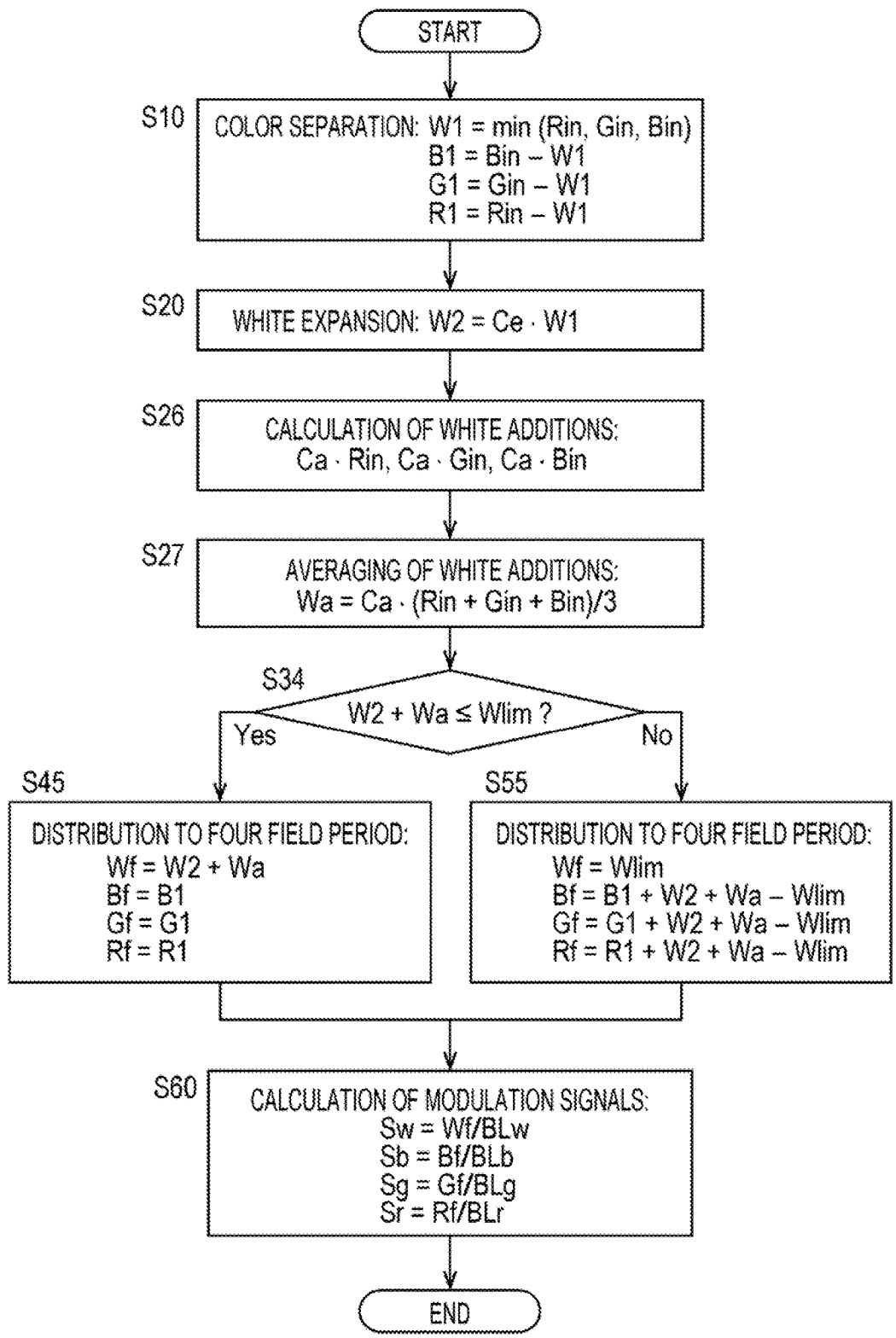
FIG. 16 is a flow chart showing a second example procedure of the modulation signal generation process according to the first example configuration of the fourth embodiment.

4.4.1 Another Example Procedure of the Modulation Signal Generation Process According to the First Example Configuration In the procedure (hereinafter referred to as "first example procedure") of the modulation signal generation process shown in FIG. 14, the first to third white addition values Ca·(R1+W2), Ca·(G1+W2), and Ca·(B1+W2) are calculated by multiplying the red, green, and blue gradation values R1+W2, G1+W2, and B1+W2 after white expansion by the ratio of white addition Ca, respectively (step S24 of FIG. 14). Alternatively, the first to third white addition value Ca·Rin, Ca·Gin, and Ca·Bin may be calculated by multiplying the input red gradation value Rin, the input green gradation value G1, and the input blue gradation value B1 by the ratio of white addition Ca, respectively. FIG. 16 is a flow chart showing a procedure (hereinafter referred to as "second example procedure") of a modulation signal generation process in which such a calculation method is employed in the first example configuration. This second example procedure includes steps S26 and S27 of FIG. 16 that replace steps S24 and S25, respectively, of FIG. 14 that are included in the first example procedure. The other steps of the second example procedure are identical to those of the first example procedure. Such a second example procedure makes it possible to make arithmetic processing slightly simpler than the first example procedure and bring about substantially the same effects as those brought about in a case where the first example procedure is used. As can be seen from the processing procedure of FIG. 16, the ratio of white expansion Ce and the ratio of white addition Ca in the present example configuration determine the degree of enhancement of the white component of the input image signal. As such, the ratio of white expansion Ce and the ratio of white addition Ca are determined in advance on the basis of the ratio of white enhancement for appropriately controlling a display state of the input image signal.

Figure 17:
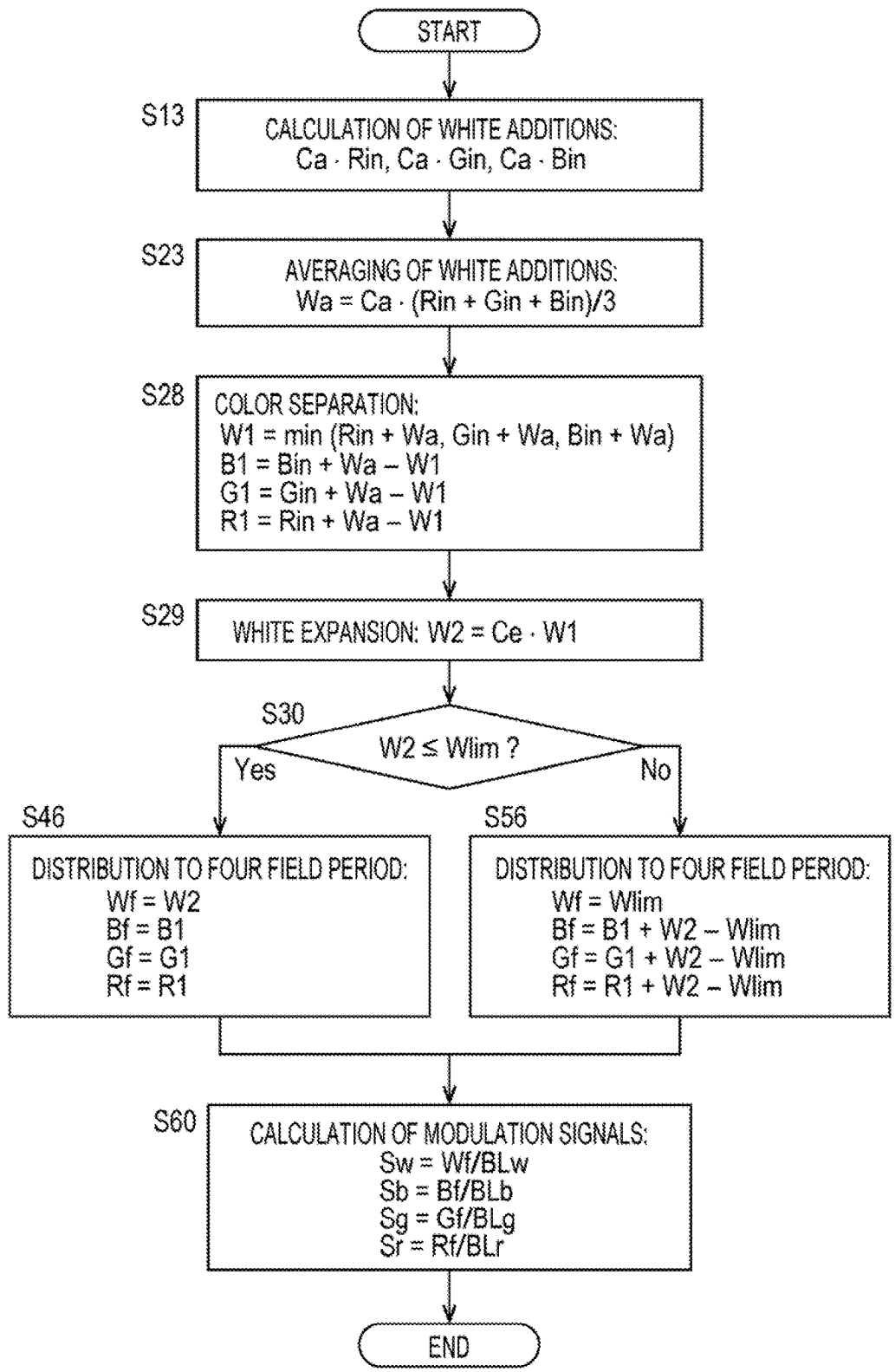
FIG. 17 is a flow chart showing a first example procedure of a modulation signal generation process according to the second example configuration of the fourth embodiment.

4.4.2 Modulation Signal Generation Process According to the Second Example Configuration FIG. 17 is a flow chart showing a procedure of a modulation signal generation process according to the second example configuration (FIG. 12) of the present embodiment. The modulation signal generation process according to the second example configuration is described below with reference to FIGS. 12 and 17.

In the present example configuration, the WBGR separation operation section 204 is included in the modulation signal operation section 206. Red, green, and blue image signals Rin, Gin, and Bin constituting an input image signal contained in an input signal Din received from an outside source in the first frame period are first stored in the image hold memory 202 and then read out from the image hold memory 202 to be supplied to the modulation signal operation section 206. The modulation signal operation section 206 performs the following processes in sequence through the white addition operation section 206b, the WBGR separation operation section 204, the white expansion section 206a, and the field distribution section 206c in accordance with input red, green, and blue gradation values Rin, Gin, and Bin respectively represented by these red, green, and blue image signals Rin, Gin, and Bin, thereby calculating a white field gradation value Wf, a red field gradation value Rf, a green field gradation value Gf, and a blue field gradation value Bf for each pixel and generating modulation signals Sw, Sb, Sg, and Sr in accordance with these four field gradation values Wf, Bf, Gf, and Rf.

First, the white addition operation section 206b calculates a first white addition value Ca·Rin, a second white addition value Ca·Gin, and a third white addition value Ca·Bin as values of the white component that are to be added according to the input red gradation value Rin, the input green gradation value Gin, and the input blue gradation values Bin (step S13 of FIG. 17). Note here that the ratio Ca is a ratio of white addition. Next, the white addition operation section 206b calculates an additional white gradation value Wa by averaging the first to third addition values Ca·Rin, Ca·Gin, and Ca·Bin. That is, the white addition operation section 206b calculates the additional white gradation value Wa according to the following formula (step S23):

$$Wa = Ca \cdot (Rin + Gin + Bin)/3 \qquad (50)$$

Next, from red, green, and blue gradation values Rin+Wa, Gin+Wa, Bin+Wa each including the additional white gradation value Wa, the WBGR separation operation section 204 generates a white component gradation value W1, a red coloring component gradation value R1, a green coloring component gradation value G1, and a blue coloring component gradation value B1 for each pixel according to formulas (51) to (54) below (step S28 of FIG. 17).

$$W1 = \min(Rin+Wa, Gin+Wa, Bin+Wa) \qquad (51)$$

$$R1 = Rin + Wa - W1 \qquad (52)$$

$$G1 = Gin + Wa - W1 \qquad (53)$$

$$B1 = Bin + Wa - W1 \qquad (54)$$

Next, the white expansion section 206a calculates an expanded white gradation value W2 from the white component gradation value W1 according to formula (55) below with use of the ratio of white expansion Ce (step S29).

$$W2 = Ce \cdot W1 \qquad (55)$$

As can be seen from the processing procedure of FIG. 17, the ratio of white expansion Ce and the ratio of white addition Ca in the present example configuration determine the degree of enhancement of the white component of the input image signal. As such, the ratio of white expansion Ce and the ratio of white addition Ca are determined in advance on the basis of the ratio of white enhancement for appropriately controlling a display state of the input image signal. It should be noted that, in the present example configuration, the generation of the expanded white gradation value W2 results in the generation of an enhanced image signal constituted by the expanded white gradation value W2, the red coloring component gradation value R1, the green coloring component gradation value G1, and the blue coloring component gradation value B1 for each pixel.

Next, the field distribution section 206c distributes the enhanced image signal, constituted by the expanded white gradation value W2, the red coloring component gradation value R1, the green coloring component gradation value G1, and the blue coloring component gradation value B1 for each pixel, to each of the field periods Tw, Tb, Tg, and Tr (steps S30 to S56). That is, the field distribution section 206c first determines whether the expanded white gradation value W2 is less than or equal to the white field gradation upper limit Wlim (step S30). In a case where, as a result of the determination, the expanded white gradation value W2 is less than or equal to the white field gradation upper limit Wlim, the field distribution section 206c assigns the white, blue, green, and red field gradation values Wf, Bf, Gf, and Rf, represented by formulas (56) to (59) below, to the white field period Tw, the blue field period Tb, the green field period Tg, and the red field period Tr, respectively (step S46).

$$Wf=W2 \quad (56)$$

$$Bf=B1 \quad (57)$$

$$Gf=G1 \quad (58)$$

$$Rf=R1 \quad (59)$$

In a case where, as a result of the determination, the expanded white gradation value W2 is greater than the white field gradation upper limit Wlim, the field distribution section 206c assigns the white, blue, green, and red field gradation values Wf, Bf, Gf, and Rf, represented by formulas (60) to (63) below, to the white field period Tw, the blue field period Tb, the green field period Tg, and the red field period Tr, respectively (step S56).

$$Wf=W\mathrm{lim} \quad (60)$$

$$Bf=B1+W2-W\mathrm{lim} \quad (61)$$

$$Gf=G1+W2-W\mathrm{lim} \quad (62)$$

$$Rf=R1+W2-W\mathrm{lim} \quad (63)$$

In accordance with the field gradation values Wf, Bf, Gf, and Rf thus assigned to the respective field periods, the field distribution section 206c calculates, according to formulas (14) to (17) above, modulation signals Sw, Sb, Sg, and Sr that are to be supplied to the pixel array driving section 208 for image display during the respective field periods (step S60).

Figure 15:
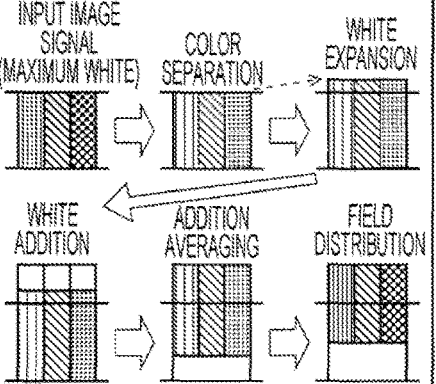
FIG. 15 illustrates diagrams (A to D) schematically showing three examples of the modulation signal generation process according to the first example configuration of the fourth embodiment and processing results thereof.
Figure 18:
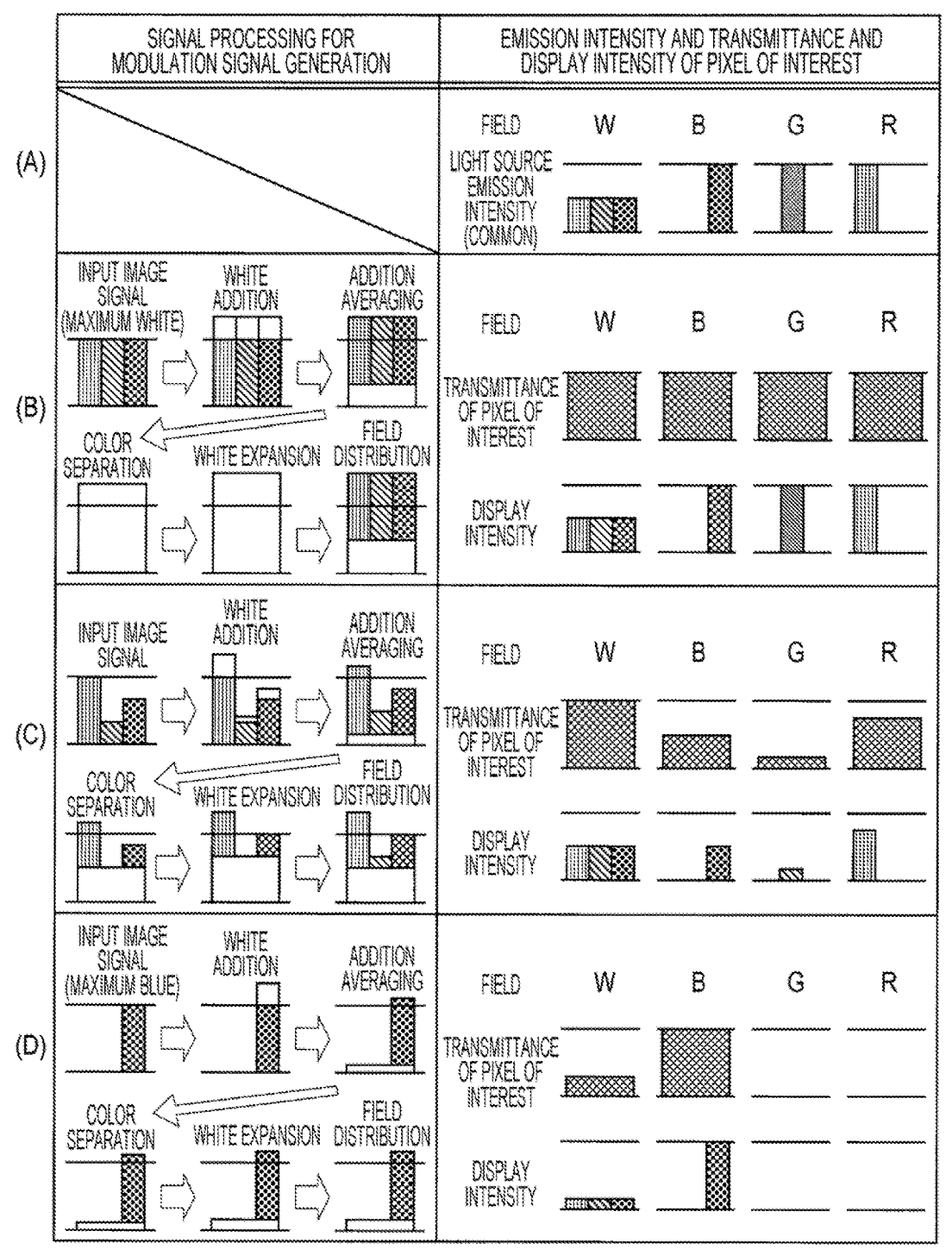

FIG. 18 illustrates diagrams showing examples of the modulation signal generation process according to the present example configuration and processing results thereof and corresponds to FIG. 15, which illustrates diagrams showing examples of the modulation signal generation process according to the first example configuration and processing results thereof. The input image signals in FIGS. 18(B) to 18(D) are the same as the input image signals in FIGS. 15(B) to 15(D), respectively. A comparison between FIGS. 18 and 15 shows that the present example configuration generates substantially the same modulation signals Sw, Sb, Sg, and Sr as those generated by the first example configuration and brings about the same effects as those brought about by the first example configuration, although the modulation signal generation process according to the present example configuration and the modulation signal generation process according to the first example configuration differ in terms of the order in which white addition, white expansion, and the like are performed.

Figure 19:
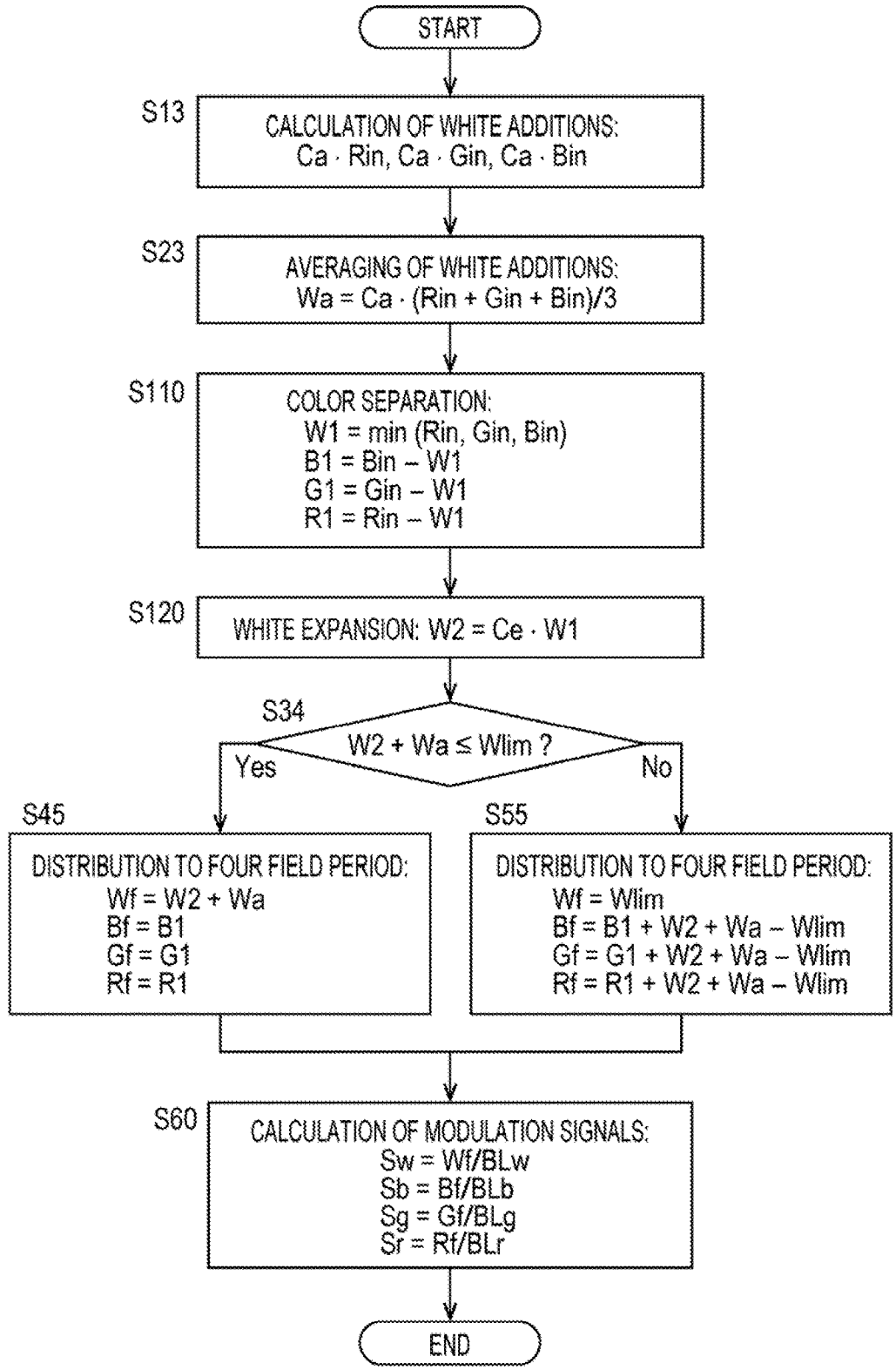
FIG. 19 is a flow chart showing a second example procedure of the modulation signal generation process according to the second example configuration of the fourth embodiment.

Further, in the procedure (hereinafter referred to as "first example procedure") of the modulation signal generation process shown in FIG. 17, color separation (step S28) is performed on the basis of the red, green, and blue gradation values Rin+Wa, Gin+Wa, and Bin+Wa each including the additional white gradation value Wa obtained by calculation and averaging of white additions (steps S13 and S23), and the expanded white gradation value W2 is calculated by multiplying the resulting white component gradation value W1 by the ratio of white expansion Ce (step S29). Alternatively, however, the expanded white gradation value W2 may be calculated by multiplying, by the ratio of white expansion Ce, a white component gradation value W1=min (Rin, Gin, Bin) obtained by color separation based on the input red gradation value Rin, the input green gradation value Gin, and the input blue gradation value Bin. FIG. 19 is a flow chart showing a procedure (hereinafter referred to as "second example procedure") of a modulation signal generation process in which such a calculation method is employed in the present example configuration. This second example procedure includes steps S110, S34, S45, and S55 of FIG. 19 that replace steps S28, S30, S46, and S56, respectively, of FIG. 17 that are included in the first example procedure. The other steps of the second example procedure are identical to those of the first example procedure. Such a second example procedure makes it possible to make arithmetic processing slightly simpler than the first example procedure and bring about substantially the same effects as those brought about in a case where the first example procedure is used. It should be noted that the second example procedure (FIG. 19) according to the present example configuration merely includes a reversal of the order of steps S10 to S20 and steps S26 to S27 of the second example procedure (FIG. 16) according to the first example configuration and it can therefore be said that the second example procedure (FIG. 19) according to the present example configuration and the second example procedure (FIG. 16) according to the first example configuration result in the same process.

Figure 20:
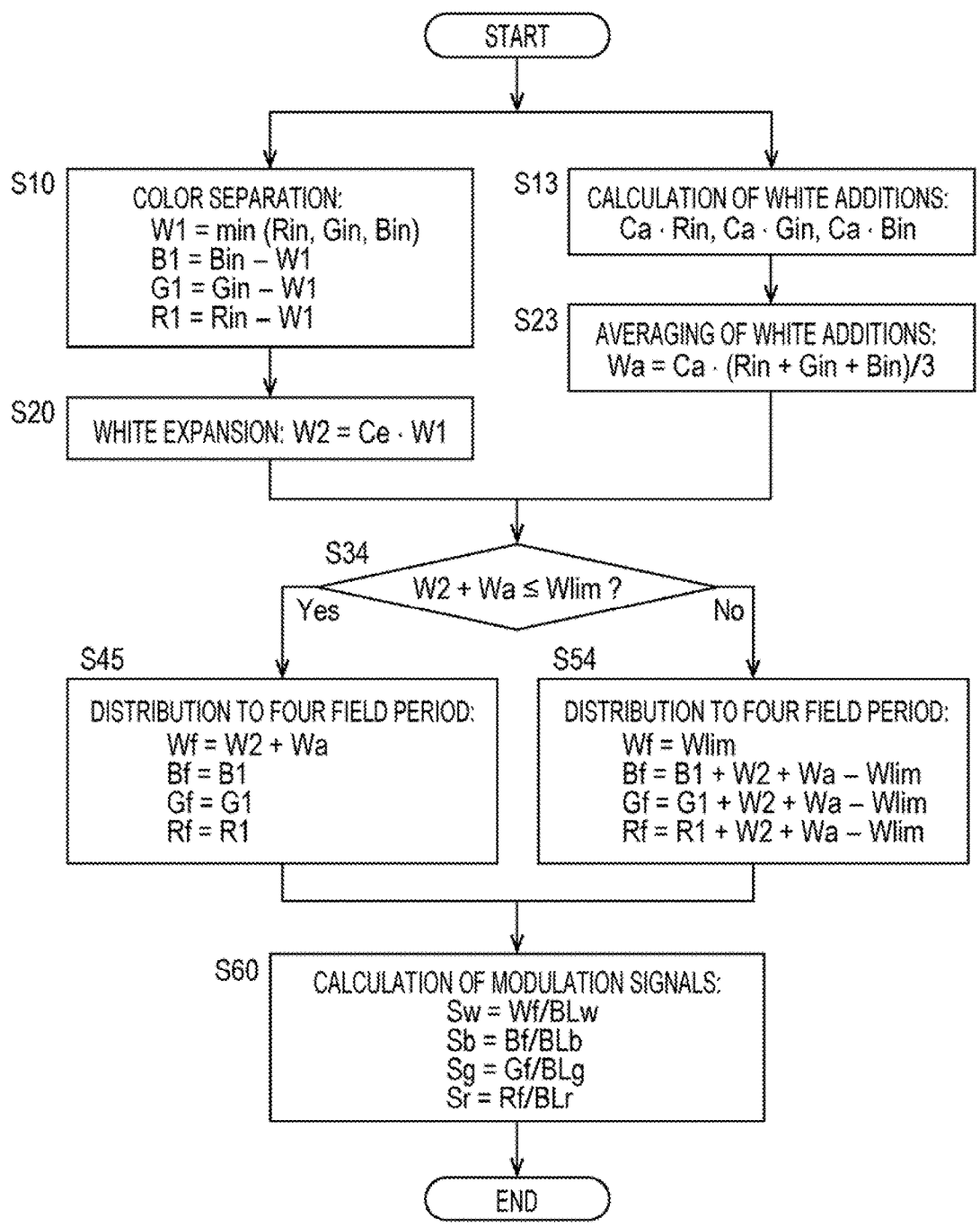
FIG. 20 is a flow chart showing a procedure of a modulation signal generation process according to the third example configuration of the fourth embodiment.

4.4.3 Modulation Signal Generation Process According to the Third Example Configuration FIG. 20 is a flow chart showing a procedure of a modulation signal generation process according to the third example configuration (FIG. 13) of the present embodiment. The modulation signal generation process according to the third example configuration is described below with reference to FIGS. 13 and 20.

As shown in FIG. 13, the present example configuration is basically the same as the first example configuration (FIG. 11); therefore, the corresponding components in the two example configurations are given the same reference signs and, as such, are not described in detail below. The present example configuration differs from the first example configuration in that the white expansion section 206a and the white addition operation section 206b perform processes in parallel. For this reason, in the present example configuration, red, green, and red image signals Rin, Gin, and Rin constituting an input image signal contained in an input signal Din received from an outside source in the first frame period are temporarily stored in the image hold memory 202 and then read out from the image hold memory 202 to be supplied to the white addition operation section 206b of the modulation signal operation section 206 and supplied to the WBGR separation operation section 204.

The red, green, and blue image signals Rin, Gin, and Bin supplied to the WBGR separation operation section 204 are subjected to color separation by the WBGR separation operation section 204 (step S10 of FIG. 20) and then supplied to the white expansion section 206a of the modulation signal operation section 206 to be subjected to white expansion by the white expansion section 206a (step S20). In parallel with these processes, the red, green, and blue image signals Rin, Gin, and Bin supplied to the white addition operation section 206b are subjected to calculation and averaging of white additions by the white addition operation section 206b (steps S13 and S23). These processes (the processes of color separation and white expansion and the processes of calculation and averaging of white additions) in the present example configuration are identical in concrete content to the corresponding processes (steps S10 to S27 of FIG. 16) of the second example procedure according to the first example configuration, except for the difference between parallel processing and serial processing. Further, the subsequent process in the present example configuration, i.e. the process in the field distribution section 206c (steps S34 to S60 of FIG. 20), too, is identical to the corresponding process (steps S34 to S60 of FIG. 16) of the second example procedure according to the first example configuration. As such, steps S10 to S60 of the modulation signal generation process according to the present example configuration are not described in detail here.

Figure 21:
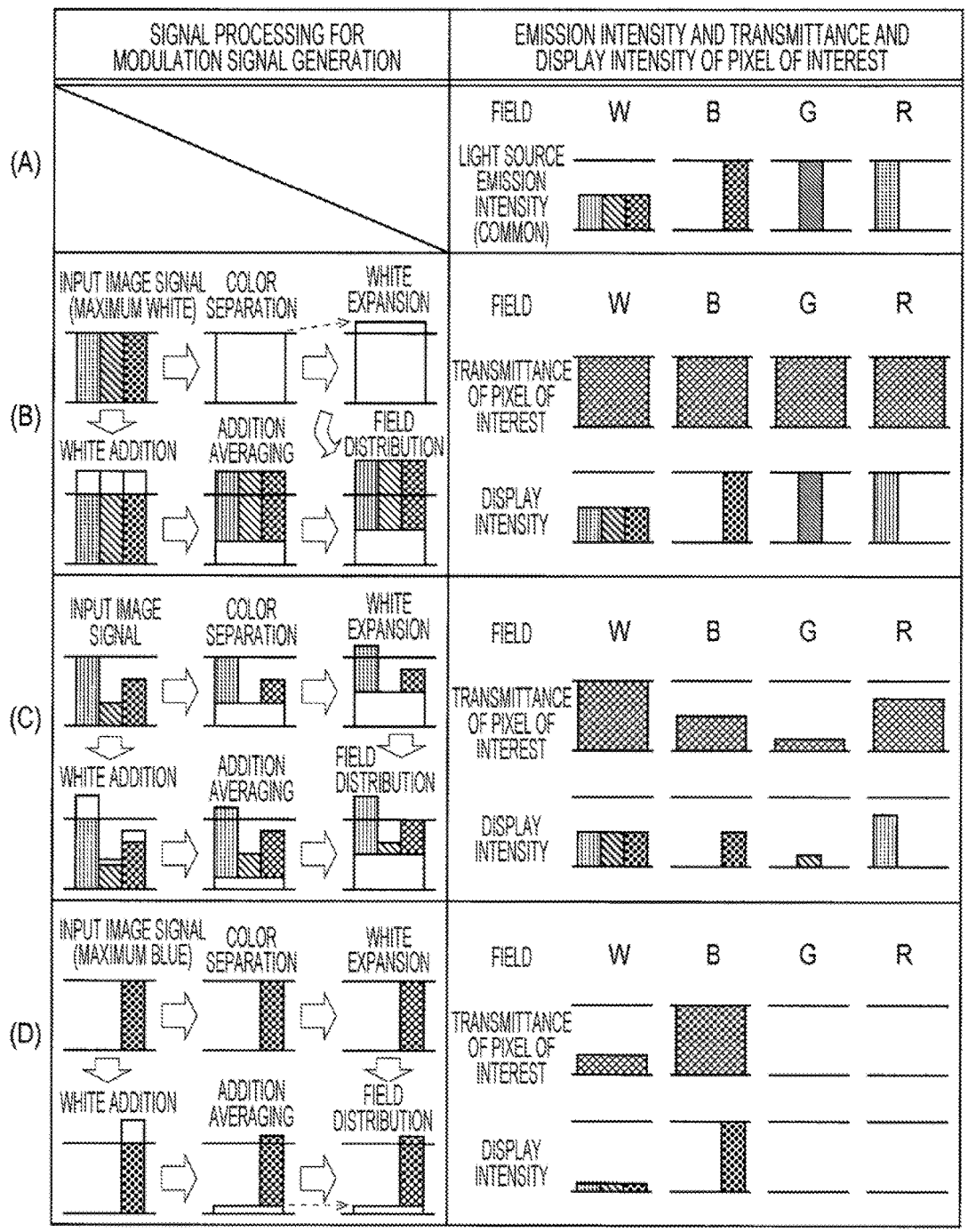
FIG. 21 illustrates diagrams (A to D) schematically showing three examples of the modulation signal generation process according to the third example configuration of the fourth embodiment and processing results thereof.

FIG. 21 illustrates diagrams showing examples of the modulation signal generation process according to the present example configuration and processing results thereof and corresponds to FIG. 15, which illustrates diagrams showing examples of the modulation signal generation process according to the first example configuration and processing results thereof. The input image signals in FIGS. 21(B) to 21(D) are the same as the input image signals in FIGS. 15(B) to 15(D), respectively. A comparison between FIGS. 21 and 15 shows that the present example configuration generates substantially the same modulation signals Sw, Sb, Sg, and Sr as those generated by the first example configuration and brings about the same effects as those brought about by the first example configuration, although the modulation signal generation process according to the present example configuration differs, for example, in terms of whether the processes of color separation and white expansion and the processes of calculation and averaging of white additions are performed in parallel or in series. Further, the present example configuration is effective in a high-resolution display device, as the parallel processing allows the modulation signal generation process to be executed at a higher speed than in the other example configurations. It should be noted that the results (modulation signals Sw, Sb, Sg, and Sr) of the modulation signal generation process according to the present example configuration (FIG. 20) are identical to the results of the modulation signal generation process according to the second example procedure in the first example configuration (FIG. 16) and also identical to the results of the modulation signal generation process according to the second example procedure in the second example configuration (FIG. 19).

5. Other Embodiments

Figure 22:
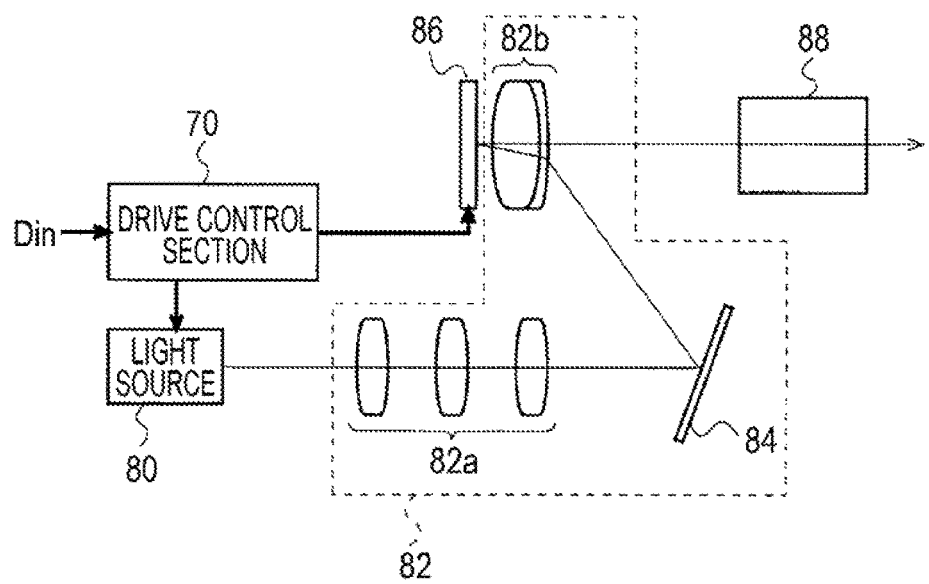
FIG. 22 is a diagram schematically showing a configuration of a projection display device according to another embodiment of the present invention.
Figure 23:
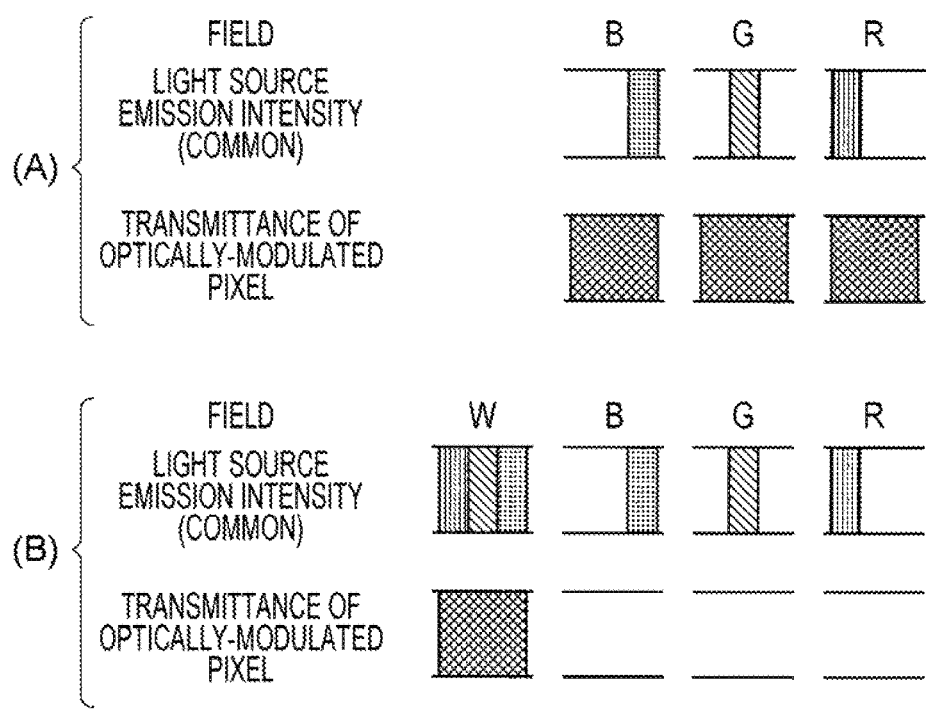
FIG. 23 illustrates schematic views (A and B) for explaining differences in power consumption between a first conventional example (simple RGB subframe system) of a field-sequential liquid crystal display device and a second conventional example (RGB+W subframe system) of a field-sequential liquid crystal display device.

In each of the embodiments described above, the liquid crystal panel 11, which transmits light from the light source 40, is used as a display panel, and an image is displayed by controlling the transmittance of the liquid crystal panel 11. However, the present invention is not limited to a field-sequential display device including a transmissive spatial light modulator such as the liquid crystal panel 11 but is applicable to a field-sequential display device including a reflective spatial light modulator. For example, the present invention is also applicable to a field-sequential projection display device including, as a spatial light modulator a reflective liquid crystal panel called LCOS (liquid crystal on silicon). FIG. 22 is a block diagram schematically showing a configuration of an example of such a projection display device.

As shown in FIG. 22, this projection display device includes a drive control section 70, a light source 80, a first lens group 82a serving as a relay lens, a second lens group 82b serving as a field lens, a mirror 84, a reflective liquid crystal panel 86 based on the LCOS technology, and a projection optical system 88. As in each of the embodiments described above, from a functional standpoint, the drive control section 70 and the light source 80 are configured to display a color image under a field sequential system in which each frame period includes four field periods corresponding to three primary colors, namely red, green, and blue, and a white color. Note, however, that, instead of generating signals (scanning-side control signal GCT, data-side control signal SCT) for controlling the transmittance of the liquid crystal panel for each pixel, the drive control section 70 generates signals that control the reflectance of a reflective liquid crystal display element for each pixel.

In this projection display device, the light source 80 is driven in the same manner as in each of the embodiments described above, and colors of light corresponding to the respective field periods are emitted to the first lens group 82b. The first lens group 82a, the second lens group 82b, and the mirror 84 constitute an illumination optical system 82, and this illumination optical system 82 causes the light from the light source 80 to form an image on a surface of the reflective liquid crystal panel 86. In this way, the light guided to the reflective liquid crystal panel 86 is reflected by the reflective liquid crystal panel 86. Since the reflectance of this reflective liquid crystal panel 86 is controlled for each pixel in accordance with the signals from the drive control section 70, the reflected light from the reflective liquid crystal panel 86 turns into light spatially modulated in accordance with the image signal contained in the input signal Din. This spatially-modulated light passes through the second lens group 82b, which serves as a field lens, again and is guided to the projection optical system 88, and this projection optical system 88 projects the light onto a screen (not illustrated) or the like.

Such a projection display device brings about the same effects as those brought about by the embodiments described above, as the emission intensity of the light source 70 and the reflectance of the reflective liquid crystal panel 86 are controlled in the same manner as the emission intensity of the light source 40 and the transmittance of the liquid crystal panel 11 in each of the embodiments described above. It should be noted that instead of including a reflective liquid crystal panel as a spatial light modulator, this projection display device may include another reflective spatial light modulator such as a DMD (Digital Micromirror Device) (registered trademark) element.

6. Modifications

The present invention is not limited to any of the embodiments described above and may be modified in various ways, provided such modifications do not depart from the scope of the present invention.

For example, although, in each of the embodiments described above, a color image is displayed every single frame period under a time-series additive color mixing system that displays images of corresponding colors during four field periods, respectively, comprising of three field periods corresponding to three primary colors and one field period corresponding to a white color and the three primary colors used here are constituted by red, green, and blue, it is alternatively possible to use three primary colors constituted by other colors. Further, each frame period may be configured to include, in addition to the four field periods, a field period during which an image of another color is displayed.

Further, although the fourth embodiment can be said to be a combination of the first and third embodiments, the present invention may encompass a combination of embodiments other than such a combination. For example, the present invention may encompass a combination of the second embodiment, in which the ratio of the white field gradation value Wf of the expanded white gradation value W2 that is to be assigned to the white field period Tw can be externally set, and the fourth embodiment, in which the processes of both white expansion and white addition are performed on the input image signal.

It should be noted that although the foregoing description has been given by taking a liquid crystal display device as an example, the present invention is not limited to a liquid crystal display device but is also applicable to a display device other than a liquid crystal display device, provided such a display device is a field-sequential color image display device that controls the transmittance or reflectance of light from a light source.

INDUSTRIAL APPLICABILITY

The present invention is applicable to a color image display device, such as a liquid crystal display device, which displays a color image under a field sequential system.

REFERENCE SIGNS LIST

10 Liquid crystal display device
11 Liquid crystal panel (spatial light modulation section)
17 Scanning signal line driving circuit
18 Data signal line driving circuit
20 Display control circuit
30 Pixel forming section
40 Backlight unit
110 Pixel array section
120 Light source section
200 Drive control section
202 Image hold memory
204 WBGR separation operation section
206 Modulation signal operation section
206a White expansion section
206b White addition operation section
206c Field distribution section
212 Light source signal operation section
214 Light source driving section
Rin Input red gradation value, red image signal
Gin Input green gradation value, green image signal
Bin Input blue gradation value, blue image signal
W1 White component gradation value, white component gradation data
R1 Red coloring component gradation value, red coloring component gradation data
G1 Green coloring component gradation value, green coloring component gradation data
B1 Blue coloring component gradation value, blue coloring component gradation data
Wf White field gradation value, white field gradation data
Rf Red field gradation value, red field gradation data
Gf Green field gradation value, green field gradation data
Bf Blue field gradation value, blue field gradation data
Sw White modulation signal
Sr Red modulation signal
Sg Green modulation signal
Sb Blue modulation signal
Tw White field period
Tr Red field period
Tg Green field period
Tb Blue field period
BCT Light source control signal

The invention claimed is:

1. A color image display device of a field sequential system in which each frame period includes four field periods comprising of three field periods corresponding to three primary colors and one field period corresponding to a white color, the color image display device comprising:

a light source section configured to be able to emit one by one four colors of light comprising of the three primary colors and the white color;

a spatial light modulation section that transmits or reflects light from the light source section; and a drive control section that drives the light source section to illuminate the spatial light modulation section with corresponding colors of light during the respective field periods and controls a transmittance or reflectance of the spatial light modulation section so that images of the corresponding colors are displayed during the respective field periods, wherein an emission intensity of the light source section during the field period corresponding to the white color is determined in advance so that the white color is displayed at a predetermined target maximum luminance by transmitted light or reflected light from the spatial light modulation section when the transmittance or reflectance of the spatial light modulation section is at its maximum during all of the four field periods, the drive control section generates an enhanced image signal by enhancing a white component of input image signal in accordance with a ratio of white enhancement defined as a value of 1.0 or greater, assigns color components of the enhanced image signal that respectively correspond to the three primary colors and the white color to the corresponding field periods so that at least part of the white component of the enhanced image signal is assigned to the field period corresponding to the white color, and, during the respective field periods, controls the transmittance or reflectance of the spatial light modulation section according to the color components thus assigned, and wherein with a ratio of white expansion and a ratio of white addition determined in advance on the basis of the ratio of white enhancement, the drive control section generates the enhanced image signal by expanding the white component of the input image signal according to the ratio of white expansion and adding an average of products for the three primary colors as a white component to the input image signal, the products being obtained by multiplying the primary color components, respectively, of the input image signal by the ratio of white addition.

2. A color image display device of a field sequential system in which each frame period includes four field periods comprising of three field periods corresponding to three primary colors and one field period corresponding to a white color, the color image display device comprising:
   a light source section configured to be able to emit one by one four colors of light comprising of the three primary colors and the white color;
   a spatial light modulation section that transmits or reflects light from the light source section; and
   a drive control section that drives the light source section to illuminate the spatial light modulation section with corresponding colors of light during the respective field periods and controls a transmittance or reflectance of the spatial light modulation section so that images of the corresponding colors are displayed during the respective field periods,
   wherein an emission intensity of the light source section during the field period corresponding to the white color is determined in advance so that the white color is displayed at a predetermined target maximum luminance by transmitted light or reflected light from the spatial light modulation section when the transmittance or reflectance of the spatial light modulation section is at its maximum during all of the four field periods,
   the drive control section generates an enhanced image signal by enhancing a white component of input image signal in accordance with a ratio of white enhancement defined as a value of 1.0 or greater, assigns color components of the enhanced image signal that respectively correspond to the three primary colors and the white color to the corresponding field periods so that at least part of the white component of the enhanced image signal is assigned to the field period corresponding to the white color, and, during the respective field periods, controls the transmittance or reflectance of the spatial light modulation section according to the color components thus assigned, and
   wherein in a case where the white component of the enhanced image signal is less than or equal to a white field gradation upper limit at which the transmittance or reflectance of the spatial light modulation section is at its maximum during the field period corresponding to the white color, the drive control section controls the transmittance or reflectance of the spatial light modulation section according to the white component during the field period corresponding to the white color and controls the transmittance or reflectance of the spatial light modulation section according to a corresponding primary color component of an image signal during each of the three field periods corresponding to the three primary colors, the image signal being obtained by subtracting the white component from the enhanced image signal, and
   in a case where the white component is greater than the white field gradation upper limit, the drive control section maximizes the transmittance or reflectance of the spatial light modulation section during the field period corresponding to the white color and controls the transmittance or reflectance of the spatial light modulation section according to a corresponding primary color component of an image signal during each of the three field periods corresponding to the three primary colors, the image signal being obtained by subtracting the white field gradation upper limit from the enhanced image signal.

3. A color image display device of a field sequential system in which each frame period includes four field periods comprising of three field periods corresponding to three primary colors and one field period corresponding to a white color, the color image display device comprising:
   a light source section configured to be able to emit one by one four colors of light comprising of the three primary colors and the white color;
   a spatial light modulation section that transmits or reflects light from the light source section; and
   a drive control section that drives the light source section to illuminate the spatial light modulation section with corresponding colors of light during the respective field periods and controls a transmittance or reflectance of the spatial light modulation section so that images of the corresponding colors are displayed during the respective field periods,
   wherein an emission intensity of the light source section during the field period corresponding to the white color is determined in advance so that the white color is displayed at a predetermined target maximum luminance by transmitted light or reflected light from the spatial light modulation section when the transmittance or reflectance of the spatial light modulation section is at its maximum during all of the four field periods,
   the drive control section generates an enhanced image signal by enhancing a white component of input image signal in accordance with a ratio of white enhancement defined as a value of 1.0 or greater, assigns color components of the enhanced image signal that respectively correspond to the three primary colors and the white color to the corresponding field periods so that at least part of the white component of the enhanced image signal is assigned to the field period corresponding to the white color, and, during the respective field periods, controls the transmittance or reflectance of the spatial light modulation section according to the color components thus assigned, and
   wherein the drive control section generates the enhanced image signal by adding an average of products for the three primary colors as a white component to the input image signal, the products being obtained by multiplying the primary color components, respectively, of the input image signal by a ratio of white addition obtained by subtracting 1 from the ratio of white enhancement.

4. The color image display device according to claim 3, wherein during the field period corresponding to the white color, the drive control section controls the transmittance or reflectance of the spatial light modulation section according to the white component, the white component being the average of the products for the three primary colors, and
   during each of the three field periods corresponding to the three primary colors, the drive control section controls the transmittance or reflectance of the spatial light modulation section according to a corresponding primary color component of the input image signal.

5. The color image display device according to claim 1, wherein in a case where the white component of the enhanced image signal is less than or equal to a white field gradation upper limit at which the transmittance or reflectance of the spatial light modulation section is at its maximum during the field period corresponding to the white color, the drive control section controls the transmittance or reflectance of the spatial light modulation section according to the white component during the field period corresponding to the white color and controls the transmittance or reflectance of the spatial light modulation section according to a corresponding primary color component of an image signal during each of the three field periods corresponding to the three primary colors, the image signal being obtained by subtracting the white component from the enhanced image signal, and in a case where the white component is greater than the white field gradation upper limit, the drive control section maximizes the transmittance or reflectance of the spatial light modulation section during the field period corresponding to the white color and controls the transmittance or reflectance of the spatial light modulation section according to a corresponding primary color component of an image signal during each of the three field periods corresponding to the three primary colors, the image signal being obtained by subtracting the white field gradation upper limit from the enhanced image signal.

6. The color image display device according to claim 1, wherein in a case where a white field gradation target value of the white component of the enhanced image signal that corresponds to a ratio of white field target assignment inputted from an outside source or determined in advance is less than or equal to a white field gradation upper limit at which the transmittance or reflectance of the spatial light modulation section is at its maximum during the field period corresponding to the white color, the drive control section, based on the ratio of white field target assignment, controls the transmittance or reflectance of the spatial light modulation section according to the white field gradation target value during the field period corresponding to the white color and controls the transmittance or reflectance of the spatial light modulation section according to a corresponding primary color component of an image signal during each of the three field periods corresponding to the three primary colors, the image signal being obtained by subtracting the white field gradation target value from the enhanced image signal, and in a case where the white field gradation target value is greater than the white field gradation upper limit, the drive control section maximizes the transmittance or reflectance of the spatial light modulation section during the field period corresponding to the white color and controls the transmittance or reflectance of the spatial light modulation section according to a corresponding primary color component of an image signal during each of the three field periods corresponding to the three primary colors, the image signal being obtained by subtracting the white field gradation upper limit from the enhanced image signal.

* * * * *